(12) United States Patent
Kodama et al.

(10) Patent No.: US 9,905,886 B2
(45) Date of Patent: Feb. 27, 2018

(54) NON-AQUEOUS LIQUID ELECTROLYTE FOR SECONDARY BATTERY AND SECONDARY BATTERY

(71) Applicant: FUJIFILM CORPORATION, Minato-ku, Tokyo (JP)

(72) Inventors: Kunihiko Kodama, Kanagawa (JP); Michio Ono, Kanagawa (JP); Ikuo Kinoshita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 644 days.

(21) Appl. No.: 14/478,887

(22) Filed: Sep. 5, 2014

(65) Prior Publication Data

US 2014/0377666 A1 Dec. 25, 2014

Related U.S. Application Data

(63) Continuation of application No. PCT/JP2013/056341, filed on Mar. 7, 2013.

(30) Foreign Application Priority Data

Mar. 8, 2012 (JP) ................. 2012-051404

(51) Int. Cl.
*H01M 10/0567* (2010.01)
*H01M 10/0569* (2010.01)
(Continued)

(52) U.S. Cl.
CPC ..... *H01M 10/0567* (2013.01); *H01M 10/052* (2013.01); *H01M 10/0525* (2013.01);
(Continued)

(58) Field of Classification Search
None
See application file for complete search history.

(56) References Cited

U.S. PATENT DOCUMENTS

2003/0068561 A1* 4/2003 Okahara ............ C07D 307/91
429/326
2003/0157413 A1 8/2003 Chen et al.

FOREIGN PATENT DOCUMENTS

JP 62-86673 A 4/1987
JP 11-307121 A 11/1999
(Continued)

OTHER PUBLICATIONS

International Search Report of PCT/JP2013/056341, dated May 21, 2013. [PCT/ISA/210].
(Continued)

*Primary Examiner* — Daniel Gatewood
(74) *Attorney, Agent, or Firm* — Sughrue Mion, PLLC

(57) ABSTRACT

A non-aqueous liquid electrolyte for a secondary battery, containing: at least one selected from a carbonate compound having a halogen atom and a sulfur-containing ring compound; an aromatic ketone compound; an organic solvent; and an electrolyte salt, in which, with respect to 100 parts by mass of the organic solvent, the aromatic ketone compound is 0.001 to 10 parts by mass and the at least one selected from a carbonate compound having a halogen atom and a sulfur-containing ring compound is 0.001 to 10 parts by mass, and more than 50% by mass of the whole amount of the organic solvent is composed of a solvent with a melting point of 10° C. or less.

8 Claims, 1 Drawing Sheet

(51) Int. Cl.
*H01M 10/0525* (2010.01)
*H01M 10/052* (2010.01)
(52) U.S. Cl.
CPC .... *H01M 10/0569* (2013.01); *H01M 2220/30* (2013.01); *H01M 2300/0025* (2013.01)

(56) References Cited

FOREIGN PATENT DOCUMENTS

| | | |
|---|---|---|
| JP | 2001-338681 A | 12/2001 |
| JP | 2004-63432 A | 2/2004 |
| JP | 2005-251677 A | 9/2005 |
| JP | 2008-186770 A | 8/2008 |
| JP | 2012-230809 A | 11/2012 |
| JP | 2012230809 A * | 11/2012 |

OTHER PUBLICATIONS

Communication dated Nov. 6, 2015 from the Korean Intellectual Property Office in counterpart application No. 10-2014-7025272.

* cited by examiner

{Fig. 1}
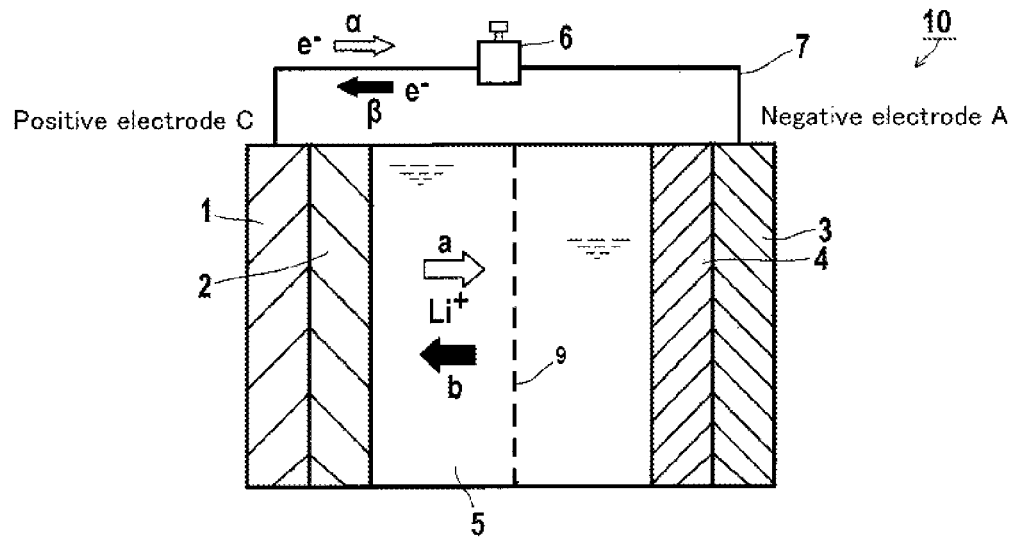
{Fig. 2}
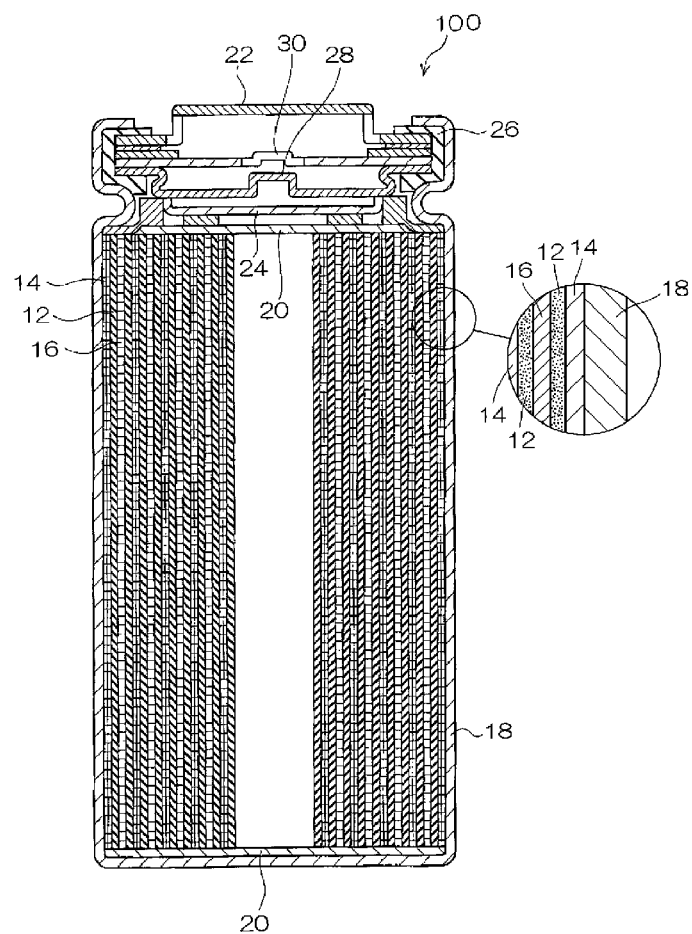

NON-AQUEOUS LIQUID ELECTROLYTE FOR SECONDARY BATTERY AND SECONDARY BATTERY

CROSS-REFERENCE TO RELATED APPLICATIONS

This application is a Continuation of PCT International Application No. PCT/JP2013/056341 filed on Mar. 7, 2013, which claims priority under 35 U.S.C. § 119 (a) to Japanese Patent Application No. 2012-051404 filed on Mar. 8, 2012. Each of the above applications is hereby expressly incorporated by reference, in its entirety, into the present application.

TECHNICAL FIELD

The present invention relates to a non-aqueous liquid electrolyte for a secondary battery containing an organic solvent, and a secondary battery using the same.

BACKGROUND ART

Secondary batteries called lithium ion batteries, currently attracting attention. They can broadly be classified into two categories of so called lithium ION secondary batteries and lithium METAL secondary batteries. The lithium METAL secondary batteries utilize precipitation and dissolution of lithium for the operation. Besides, the lithium ION secondary batteries utilize storage and release of lithium in the charge-discharge reaction. These batteries both can realize charge-discharge at large energy densities as compared with lead batteries or nickel-cadmium batteries. By making use of this characteristic, in recent years, these batteries have been widely applied to portable electronic equipment such as camera-integrated VTR's (video tape recorders), mobile telephones, and notebook computers. In accordance with a further expansion of applications, the development of lightweight secondary batteries such as to allow higher energy densities has been advanced as a power source of the portable electronic equipment. Furthermore, there is a strong demand for size reduction, service life prolongation, and safety enhancement.

Regarding a liquid electrolyte, a particular combination of materials has widely been employed, for non-aqueous secondary batteries as represented by lithium ion secondary batteries or lithium metal secondary batteries (hereinafter, these may be collectively referred to simply as a lithium ion secondary battery), in order to realize high electric conductivity and potential stability. That is, a carbonic acid ester-based solvent such as propylene carbonate or diethyl carbonate is employed, in combination with an electrolyte salt such as lithium hexafluorophosphate.

With respect to the composition of a liquid electrolyte, a technique for making various kinds of additives to be contained in a liquid electrolyte is proposed for the purpose of improving battery characteristics. For example, Patent Literature 1 describes an attempt to improve coulombic efficiency and the like of a lithium electrode of lithium metal batteries by adding a predetermined aromatic compound. Patent Literature 2 discloses an example such that various organic compounds are applied as an overcharge preventing agent in a secondary battery using lithium titanate for a negative electrode. Further, Patent Literature 3 describes an attempt to improve cycling characteristics by using aromatic compound additives having specific solvents and specific structures.

CITATION LIST

Patent Literatures

Patent Literature 1: JP-A-62-86673 ("JP-A" means unexamined published Japanese patent application)
Patent Literature 2: JP-A-2008-186770
Patent Literature 3: JP-A-2004-63432

SUMMARY OF THE INVENTION

Technical Problem

Recent portable electronic equipment has been offering still higher performance and further multifunction. Accordingly, charge and discharge of a secondary battery compelled to be repeated so frequently that cycling characteristics tend to easily deteriorate. Besides, it is assumed that the portable electronic equipment is used in various temperature ranges. Under the circumstance, it is still insufficient for the contemporaneous achievement of cycling characteristics of a secondary battery at high temperature and deterioration suppression of battery characteristics at low temperature. Thus, further improvement thereof has been demanded.

The present invention has been made in view of such situation. The present invention thus addresses to the provision of a non-aqueous liquid electrolyte for a secondary battery and a secondary battery provided with high cycling characteristics and low-temperature characteristics (maintainability of discharge capacity at low temperature).

Means to Solve the Problem

The inventors were in pursuit of the above technical subject, and they have eventually found out that high cycling characteristics and battery characteristics at low temperature may be contemporaneously achieved, by employing two kinds of specific additives and a specific solvent at a specific ratio in combination, where it cannot be achieved by the each means.

The above-described problems of the present invention were solved by the following means.
<1> A non-aqueous liquid electrolyte for a secondary battery, containing:
 at least one selected from a sulfur-containing ring compound and a carbonate compound having a halogen atom;
 an aromatic ketone compound;
 an organic solvent; and
 an electrolyte salt,
 wherein, with respect to 100 parts by mass of the organic solvent, the aromatic ketone compound is 0.001 to 10 parts by mass and the at least one selected from a carbonate compound having a halogen atom and a sulfur-containing ring compound is 0.001 to 10 parts by mass, and
 more than 50% by mass of the whole amount of the organic solvent comprises a solvent with a melting point of 10° C. or less.
<2> The non-aqueous liquid electrolyte for a secondary battery as described in item <1>, wherein the solvent with a melting point of 10° C. or less contains a compound having a chain carbonate structure or an ester structure.
<3> The non-aqueous liquid electrolyte for a secondary battery as described in item <1> or <2>, wherein the organic solvent is composed of a compound except the carbonate compound having a halogen atom, the sulfur-containing ring compound, and the aromatic ketone compound.

<4> The non-aqueous liquid electrolyte for a secondary battery described in any one of items <1> to <3>, wherein the organic solvent is composed of an atom selected from a carbon atom, a hydrogen atom, an oxygen atom, a nitrogen atom, a phosphorus atom, and a boron atom.

<5> The non-aqueous liquid electrolyte for a secondary battery described in any one of items <1> to <4>, wherein the sulfur-containing ring compound has a partial structure represented by the following formula (S1), (S2) or (S3):

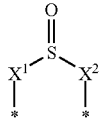

(S1)

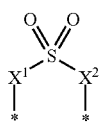

(S2)

(S3)

wherein $X^1$ and $X^2$ represent —O— or —C(Ra)(Rb)—; Ra and Rb represent a hydrogen atom or a substituent; and * represents a binding site.

<6> The non-aqueous liquid electrolyte for a secondary battery described in item <5>, wherein the compound having the partial structure represented by formula (S1), (S2) or (S3) is a compound represented by the following formula (S1-1), (S2-1) or (S3-1):

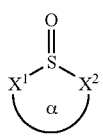

(S1-1)

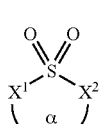

(S2-1)

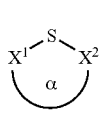

(S3-1)

wherein $X^1$ and $X^2$ have the same meanings as those of the formulae (S1), (S2) and (S3); and α represents a group of atoms for forming a 5- or 6-membered ring.

<7> The non-aqueous liquid electrolyte for a secondary battery described in any one of items <1> to <4>, wherein the carbonate compound containing a halogen atom is a compound represented by the following formula (F1) or (F2):

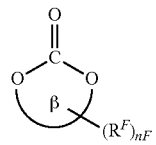

(F1)

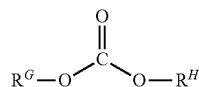

(F2)

wherein $R^F$ represents a hydrogen atom or a substituent having a halogen atom; nF represents 1 or 2; β represents a group of atoms for forming a 5- or 6-membered ring; and $R^G$ and $R^H$ represent an alkyl group, any one of $R^G$ and $R^H$ has a halogen atom, and an oxy group may exists in the alkyl group.

<8> The non-aqueous liquid electrolyte for a secondary battery described in any one of items <1> to <7>, wherein the aromatic ketone compound is a compound represented by the following formula (1):

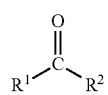

(1)

wherein $R^1$ and $R^2$ represent an aromatic group; and $R^1$ and $R^2$ may bind to each other directly or via a linking group to form a 5- to 8-membered ring containing C=O of formula (1), and may form a multimer.

<9> The non-aqueous liquid electrolyte for a secondary battery described in item <8>, wherein the aromatic ketone compound represented by formula (1) is a compound represented by the following formula (2):

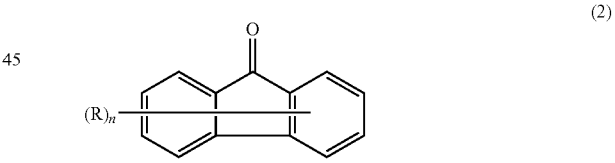

(2)

wherein R represents a substituent; and n represents an integer of 0 to 8.

<10> The non-aqueous liquid electrolyte for a secondary battery described in item <8>, wherein the aromatic ketone compound represented by formula (1) is a compound represented by any one of the following formulae (1-1) to (1-24):

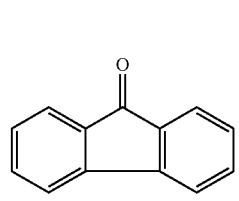

(1-1)

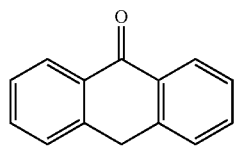
(1-2)
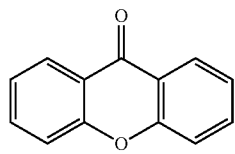
(1-3)
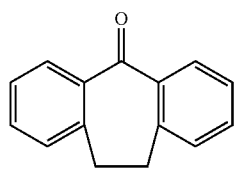
(1-4)
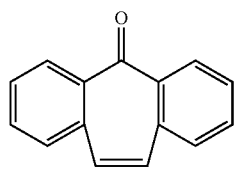
(1-5)
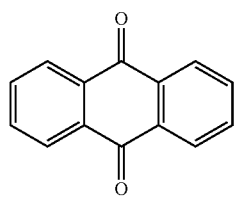
(1-6)
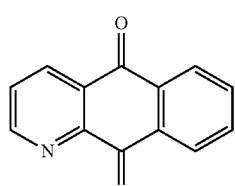
(1-7)
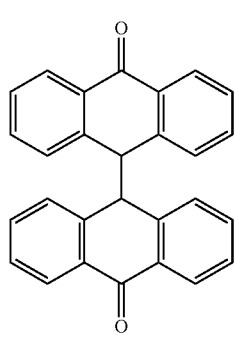
(1-8)
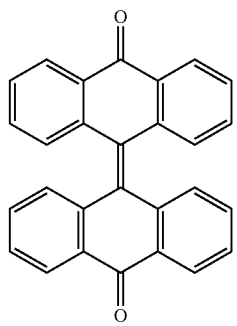
(1-9)
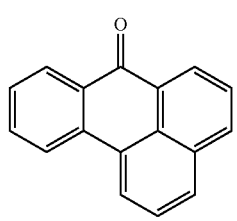
(1-10)
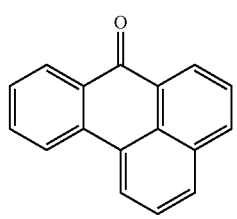
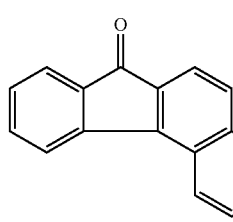
(1-11)
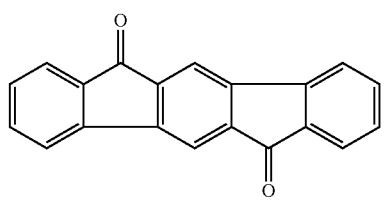
(1-12)
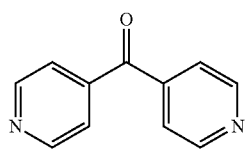
(1-13)
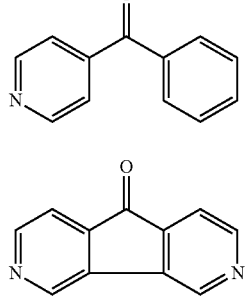
(1-14)
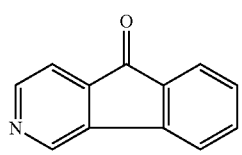
(1-15)
(1-16)

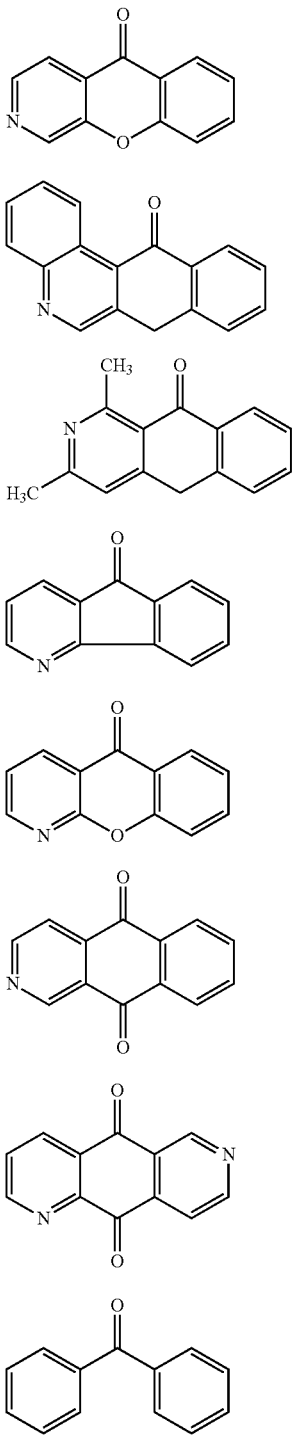

wherein the compound represented by each of the formulae may be substituted or unsubstituted.

<11> A lithium secondary battery using the non-aqueous liquid electrolyte for a secondary battery described in any one of items <1> to <10>.

Effects of the Invention

The non-aqueous liquid electrolyte for a secondary battery and the secondary battery using the same of the present invention realize compatibility between excellent cycling characteristics at high temperature and battery characteristics at low temperature.

Other and further features and advantages of the invention will appear more fully from the following description, appropriately referring to the accompanying drawings.

BRIEF DESCRIPTION OF THE DRAWINGS

FIG. 1 is a cross-sectional diagram illustrating a mechanism of a lithium ion secondary battery according to a preferable embodiment of the present invention, by modeling.

FIG. 2 is a cross-sectional diagram schematically illustrating a specific configuration of a lithium ion secondary battery according to a preferable embodiment of the present invention.

MODE FOR CARRYING OUT THE INVENTION

[Non-Aqueous Liquid Electrolyte for a Secondary Battery]

The non-aqueous liquid electrolyte for a secondary battery of the present invention realizes compatibility between high cycling characteristics and battery characteristics at low temperature by containing two kinds of characteristic improving agents of specific amounts in an organic solvent containing a solvent with a melting point of 10° C. or less by more than 50% by mass. An aromatic ketone compound is selected as a characteristic improving agent [1], and at least one selected from a carbonate compound having a halogen atom and a sulfur-containing ring compound is selected as a characteristic improving agent [2]. The present invention is hereinafter described in detail while centering on preferable embodiments thereof.

(Characteristic Improving Agent [1])

The non-aqueous liquid electrolyte for a secondary battery of the present invention contains an aromatic ketone compound as a characteristic improving agent [1].

The aromatic ketone compound is a ketone compound having an aromatic group in a molecule. Herein, the aromatic group denotes a hydrocarbon aromatic group and a heteroaromatic group (unsaturated heterocyclic group).

A preferable structure among the aromatic ketone compounds is a structure represented by the following formula (1).

$R^1$ and $R^2$ in the formula (1) denote an aromatic group or a heteroaromatic group (unsaturated heterocyclic group). $R^1$ and $R^2$ may be bind to each other directly or via a linking group to form a 5- to 8-membered ring containing C=O of formula (1). Incidentally, the compound represented by formula (1) may bind by plurality to compose a multimer. In the present invention, $R^1$ and $R^2$ are preferably bind to each other directly or via a linking group to form a 5- to 8-membered ring containing C=O.

The compound represented by formula (1) is preferably one selected from the group consisting of a 9-fluorenone compound, an anthrone compound, a xanthone compound, a dibenzosuberon compound, a dibenzosubereron compound, an anthraquinone compound, a bianthronyl compound, a bianthrone compound, a benzophenone compound, and derivatives thereof. The compound represented by formula (1) is preferably a compound having a skeleton represented by the formulae (1-1) to (1-24) described later in representing by a chemical structural formula (In the present invention, a skeleton of a predetermined chemical structure signifies a compound having the chemical structure as well as a compound having the structure as a parent nucleus. Incidentally, the term "compound" is the same as is defined in the following). Further, in other words, the structure includes the structures of a 9-fluorenone skeleton (1-1), an anthrone skeleton (1-2), a xanthone skeleton (1-3), a dibenzosuberon skeleton (1-4), a dibenzosubereron skeleton (1-5), an anthraquinone skeleton (1-6), a bianthronyl skeleton (1-8), a bianthrone skeleton (1-9), a benzophenone skeleton, and a structure such that one or two pieces of carbon atoms of the aromatic ring are substituted with nitrogen atoms (1-7, 1-13 to 1-23 and the like), or a structure such that four pieces of carbon are condensed to a benzene ring to form a polycyclic aromatic ring (such as a naphthalene ring) (1-10, 1-11 and the like). Also, these skeletons may have a substituent; examples of the preferable substituent include the following substituent T, and more preferable substituent is a methoxy group, a fluorine atom, a cyano group, a methanesulfonyl group, and an acetyl group.

Examples of the substituent T include an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, e.g. 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxyphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group having 0 to 20 carbon atoms, e g amino, N,N-dimethylamino, N,N-diethylamino, N-ethylamino, or anilino), a sulfonamide group (preferably a sulfonamide group having 0 to 20 carbon atoms, e.g. N,N-dimethylsulfonamide, or N-phenylsulfonamide), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, or N-phenylcarbamoyl), an acylamino group (preferably an acylamino group having 1 to 20 carbon atoms, e.g. acetylamino, or benzoylamino), a cyano group, a hydroxyl group and a halogen atom (e.g. a fluorine atom, a chlorine atom, a bromine atom, or an iodine atom). Among these, an alkyl group, an alkenyl group, an aryl group, a heterocyclic group, an alkoxy group, an aryloxy group, an alkoxycarbonyl group, an amino group, an acylamino group, a cyano group and a halogen atom are more preferable; and an alkyl group, an alkenyl group, a heterocyclic group, an alkoxy group, an alkoxycarbonyl group, an amino group, an acylamino group and a cyano group are particularly preferable.

When a compound, a substituent or the like contains an alkyl group, an alkenyl group or the like, these groups may be linear or branched, and may be substituted or unsubstituted. Furthermore, when the compound, substituent or the like contains an aryl group, a heterocyclic group or the like, they may be monocyclic or fused-cyclic, and may be substituted or unsubstituted.

The compound represented by formula (1) is furthermore preferably a compound represented by the following formula (2).

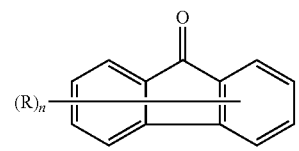

(2)

In formula (2), R represents a substituent. The substituent includes the substituent T above, and the substituent is more preferably an alkoxy group having 1 to 6 carbon atoms, a halogen atom (for example, a fluorine atom), and a cyano group. n represents an integer of 0 to 8, preferably an integer of 0 to 2.

Examples of the compound represented by formula (1) include the followings. However, the present invention is not comprehended while limited by these examples. The compound represented by each of the formulae may have a substituent (preferably the above-mentioned substituent R) or unsubstituted, and is more preferably each compound represented on the right-hand side of each of the formulae.

(1-1)

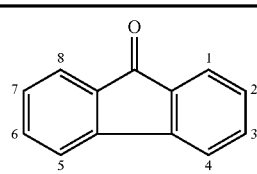

| | |
|---|---|
| (1-1-a): | unsubstituted type |
| (1-1-b): | 2-methoxy type |
| (1-1-c): | 2-ethoxy type |
| (1-1-d): | 3-fluoro type |
| (1-1-e): | 3,6-difluoro type |
| (1-1-f): | 3-methoxy type |
| (1-1-g): | 2-cyano type |
| (1-1-h): | 3-cyano type |
| (1-1-i): | 2,7-dimethoxy type |
| (1-1-j): | 2-fluoro type |

-continued (1-2)
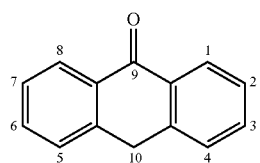 [SMILES: O=C1c2ccccc2Cc2ccccc21]

(1-2-a): unsubstituted type
(1-2-b): 2-methoxy type
(1-2-c): 10,10-dimethyl type
(1-2-d): 3-fluoro type
(1-2-e): 3,6-difluoro type (1-3)
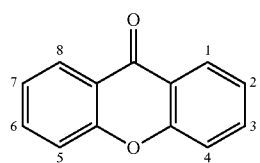

(1-3-a): unsubstituted type
(1-3-b): 2-methoxy type
(1-3-c): 2-t-butyl type
(1-3-d): 3-fluoro type
(1-3-e): 3,6-difluoro type (1-4)
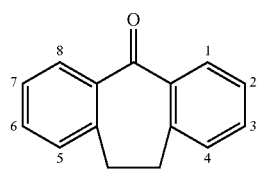 [SMILES: O=C1c2ccccc2CCc2ccccc21]

(1-4-a): unsubstituted type
(1-4-b): 2-methoxy type
(1-4-c): 2-t-butyl type
(1-4-d): 3-fluoro type
(1-4-e): 3,6-difluoro type (1-5)
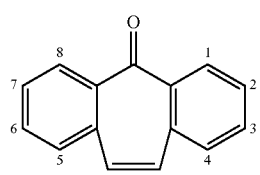 [SMILES: O=c1c2ccccc2ccc2ccccc12]

(1-5-a): unsubstituted type
(1-5-b): 2-methoxy type
(1-5-c): 2-t-butyl type
(1-5-d): 3-fluoro type
(1-5-e): 3,6-difluoro type (1-6)
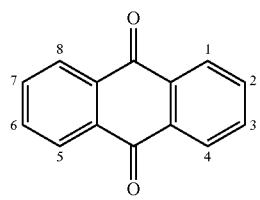 [SMILES: O=C1c2ccccc2C(=O)c2ccccc21]

(1-6-a): unsubstituted type
(1-6-b): 2-methoxy type
(1-6-c): 2-t-butyl type
(1-6-d): 2,6-di-t-butyl type
(1-6-e): 3,6-difluoro type
(1-6-f): 2-fuluoro type (1-7)
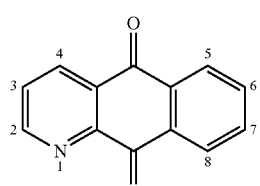

(1-7-a): unsubstituted type
(1-7-b): 2-methyl type
(1-7-c): 6-t-butyl type (1-8)
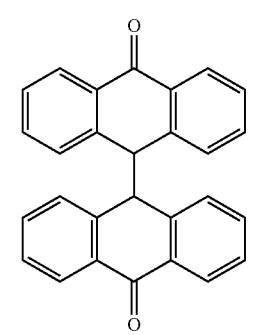 [SMILES: O=C1c2ccccc2C(C2c3ccccc3C(=O)c3ccccc32)c2ccccc21]

(1-8-a): unsubstituted type (1-9)
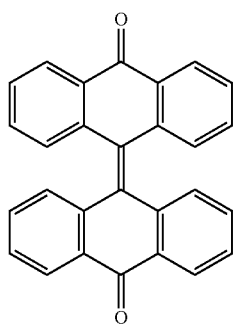 [SMILES: O=C1c2ccccc2C(=C2c3ccccc3C(=O)c3ccccc32)c2ccccc21]
(1-9-a): unsubstituted type
(1-10)
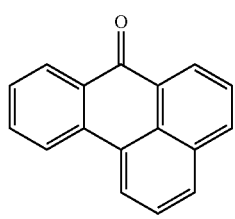 [SMILES: O=C1c2ccccc2-c2cccc3cccc1c23]
(1-10-a): unsubstituted type
(1-11)
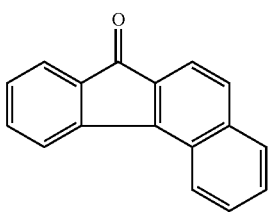 [SMILES: O=C1c2ccccc2-c2c1ccc1ccccc21]
(1-11-a): unsubstituted type
(1-12)
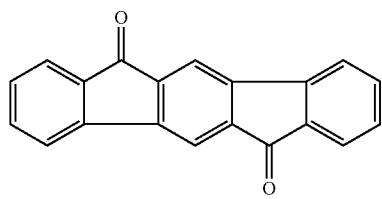 [SMILES: O=c1c2ccccc2c2cc3c(=O)c4ccccc4c3cc12]
(1-12-a): unsubstituted type
(1-13)
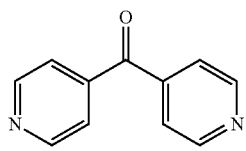 [SMILES: O=C(c1ccncc1)c1ccncc1]
(1-13-a): unsubstituted type
(1-14)
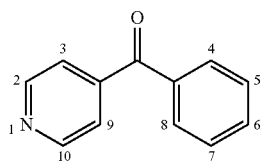
(1-14-a): unsubstituted type
(1-14-b): 2,10-dimethyl type
(1-14-c): 6-fuluoro type
(1-15)
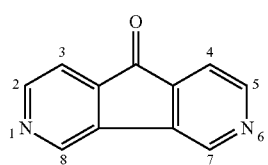
(1-15-a): unsubstituted type
(1-15-b): 5-methoxy type
(1-15-c): 2-methyl type
(1-15-d): 5-fuluoro type

| | | |
|---|---|---|
| (1-16) | 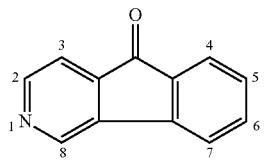 | (1-16-a): unsubstituted type<br>(1-16-b): 5-methoxy type<br>(1-16-c): 2-methyl type |
| (1-17) | 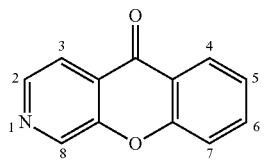 | (1-17-a): unsubstituted type<br>(1-17-b): 5-fuluoro type<br>(1-17-c): 2-methyl type |
| (1-18) | 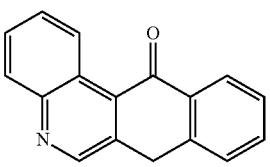 [SMILES: O=C1c2ccccc2Cc2cnc3ccccc3c21] | (1-18-a): unsubstituted type |
| (1-19) | 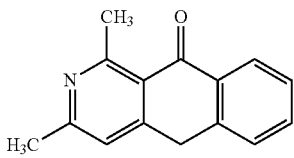 [SMILES: Cc1cc2c(c(C)n1)C(=O)c1ccccc1C2] | (1-19-a): unsubstituted type |
| (1-20) | 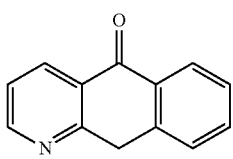 [SMILES: O=C1c2ccccc2Cc2ncccc21] | (1-20-a): unsubstituted type |
| (1-21) | 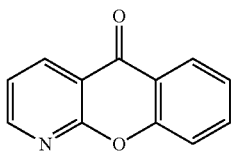 | (1-21-a): unsubstituted type |
| (1-22) | 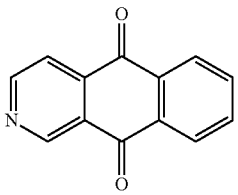 | (1-22-a): unsubstituted type |
| (1-23) | 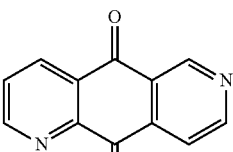 | (1-23-a): unsubstituted type |
| (1-24) | 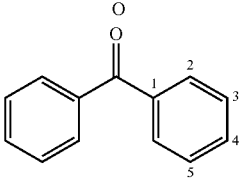 | (1-24-a): unsubstituted type<br>(1-24-b): 4-fuluoro type<br>(1-24-c): 4,4'-difuluoro type<br>(1-24-d): 3,3'-difuluoro type<br>(1-24-e): 3,3'-bistrifuluoro type<br>(1-24-f): 4-cyano type<br>(1-24-g): 4-methoxy type |

The above-mentioned compound having a skeleton of the formulae (1-1) to (1-24) may bond to each other directly or through a linking group to form a multimer of a dimer or more. Among the compounds having the above-mentioned skeleton, the compounds having the skeleton of (1-1), (1-6), (1-2), (1-3), (1-4) and (1-24) are more preferable, and the compounds having the skeleton of (1-1) and (1-24) are particularly preferable.

From the viewpoints of sufficiently bringing out the effect of improving low-temperature characteristics and reducing internal resistance of a battery, the added amount of the characteristic improving agent [1] is 0.001 to 10 parts by mass, preferably 0.001 to 5 parts by mass, more preferably 0.01 to 1 part by mass, particularly preferably 0.05 to 0.5 part by mass with respect to 100 parts by mass of an organic solvent in the present invention.

(Characteristic Improving Agent [2])

The liquid electrolyte of the present invention contains at least one selected from a carbonate compound containing a halogen atom and a sulfur-containing ring compound as a characteristic improving agent [2].

The liquid electrolyte of the present invention contains the characteristic improving agent [2] by 0.001 to 10 parts by mass with respect to 100 parts by mass of an organic solvent. The preferable content is 0.001 to 5 parts by mass with respect to 100 parts by mass of an organic solvent, more preferably 0.01 to 1 part by mass, furthermore preferably 0.05 to 0.5 part by mass. In the case of using plural characteristic improving agents [2] together, the above-mentioned range is prescribed as the total amount thereof.

(Carbonate Compound Containing a Halogen Atom)

A carbonate compound containing a halogen atom (also referred to as a halogen-substituted carbonate compound) is preferably a carbonate compound having a fluorine atom, a chlorine atom and a bromine atom, more preferably a carbonate compound having a fluorine atom. The number of fluorine atoms is preferably 1 to 6, more preferably 1 to 3. The carbonate compound may be chain-like or cyclic, preferably cyclic carbonate with high electrolyte salt (such as a lithium ion) ligating property, particularly preferably 5-membered ring cyclic carbonate from the viewpoint of ion conductivity.

The halogen-substituted carbonate compound is preferably a halogen-substituted carbonate compound represented by the following formula (F1) or (F2).

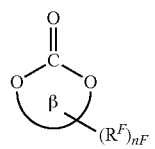

(F1)

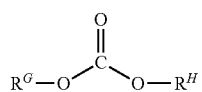

(F2)

$R^F$

In formula (F1), $R^F$ represents a halogen atom or a substituent containing a halogen atom. The substituent includes the substituent T above. Preferably are a halogen atom, a halogen-substituted alkyl group (preferably having 1 to 12 carbon atoms, more preferably having 1 to 6 carbon atoms, particularly preferably 1 to 3 carbon atoms, among them, a trifluoromethyl group is preferable).

nF nF represents 1 or 2. When nF is 2, two $R^F$'s may be the same or different from each other. Two $R^F$'s may bind to each other to form a ring.

β

β represents a group of atoms for forming a 5- or 6-membered ring.

$R^G$ and $R^H$ $R^G$ and $R^H$ represent an alkyl group, at least one of them has a halogen atom, and an oxy group may exist in the alkyl group. In the case of having no halogen atom, the alkyl group is preferably a straight-chain or branched alkyl group with a carbon atom number of 1 to 4. In the case of having a halogen atom, above all, the alkyl group is preferably a straight-chain or branched alkyl group with a carbon number of 1 to 6 having a halogen atom at an end, more preferably a straight-chain or branched alkyl group with a carbon number of 1 to 4 having a halogen atom at an end. A fluorine atom is preferable as the halogen atom.

Preferable examples of the halogen-substituted carbonate compound are described below. Among them, a compound represented by any one of FC-1 to FC-4 is particularly preferable, a compound represented by FC-1 is most preferable.

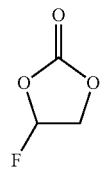

FC-1

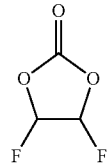

FC-2

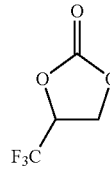

FC-3

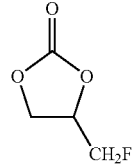

FC-4

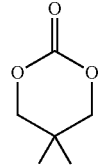

FC-5

-continued

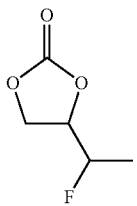
FC-6

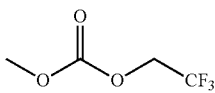
FC-7

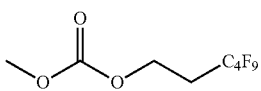
FC-8

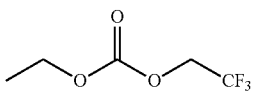
FC-9

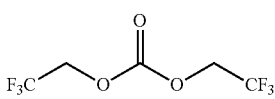
FC-10

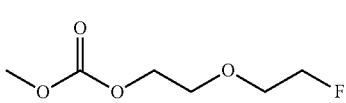
FC-11

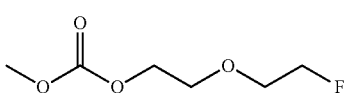
FC-12

(Sulfur-Containing Ring Compound)

Any sulfur-containing ring compound may be used as long as it has a sulfur atom and a ring structure, and preferably contains a sulfur atom as an atom for forming a ring structure. Further, a compound having an S=O bond is preferable for the reason that oxidative decomposition is restrained during charge and discharge. A 5-membered ring and a 6-membered ring are preferable as a ring structure.

Examples of a preferable compound include a compound having a partial structure of the following formula (S1), (S2) or (S3).

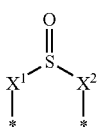
(S1)

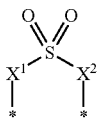
(S2)

(S3)

In formulae, $X^1$ and $X^2$ represent —O— or —C(Ra)(Rb)—. Herein, Ra and Rb represent a hydrogen group or a substituent. * represents a position at which an arbitrary substituent binds to. Ra, Rb and the arbitrary substituent may include the substituent T above, and an alkyl group having 1 to 8 carbon atoms, a fluorine atom and an aryl group having 6 to 10 carbon atoms are preferable. $X^1$ and $X^2$ preferably represent —O— or —CH$_2$—. An optional substituent binding at the above-mentioned * may bind or condense to each other to form a ring.

The compound represented by formula (S1), (S2) or (S3) is preferably a compound represented by formula (S1-1), (S2-1) or (S3-1), respectively.

(S1-1)

(S2-1)

(S3-1)

In formulae (S1-1), (S2-1) and (S3-1), $X^1$ and $X^2$ have the same meanings as those of the formulae (S1), (S2) and (S3); and a represents a group of atoms for forming a 5- or 6-membered ring. The skeleton of a may contain a sulfur atom, an oxygen atom, and the like in addition to a carbon atom. α may be substituted; examples of a substituent include the above-mentioned substituent T, preferably an alkyl group (preferably a carbon number of 1 to 12, more preferably a carbon number of 1 to 6, particularly preferably a carbon number of 1 to 3), a fluorine atom, and an aryl group (preferably a carbon number of 6 to 22, more preferably a carbon number of 6 to 14). The atomic group between $X^1$ and $X^2$ for composing a is preferably a substituted or unsubstituted ethylene chain, or a substituted or unsubstituted propylene chain.

Specific examples of a preferable sulfur-containing ring compound include the following compounds, and the following compounds whose hydrogen atom is substituted with a substituent (such as a substituent T).

S01

S02

S03

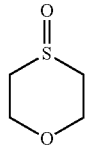

-continued

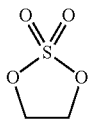
S04

S05

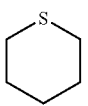
S06

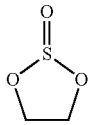
S07

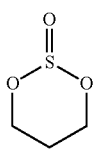
S08

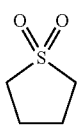
S09

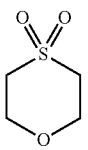
S10

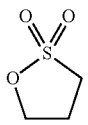
S11

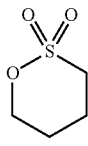
S12

The ratio of the above-mentioned characteristic improving agent [1] and characteristic improving agent [2] is preferably 1/10 to 10/1, more preferably 1/5 to 5/1, furthermore preferably 1/3 to 3/1, particularly preferably 1/3 to 1/1 at mass ratio. The liquid electrolyte of the present invention develops a great effect by simultaneously using both of the characteristic improving agents [1] and [2]. The mechanism thereof is not clear, but it is conceived that active species produced electrochemically from one characteristic improving agent reacts with the other characteristic improving agent to form a reaction product (such as an SEI film) for improving cycling characteristics. In the present invention, it is conceived to be important to produce the above-mentioned reaction product with effective amount and high efficiency; from this viewpoint, in the present invention, it is particularly preferable that the amount and ratio of the above-mentioned two characteristic improving agents are adjusted and combined in the above-mentioned range. Thus, low-temperature characteristics may be brought out further effectively while maintaining excellent cycling characteristics in a secondary battery.

(Organic Solvent)

The liquid electrolyte of the present invention contains an organic solvent and contains a solvent with a melting point of 10° C. or less by more than 50% by mass with respect to the whole amount of the organic solvent. The content of a solvent with a melting point of 10° C. or less is preferably 60% by mass or more, more preferably 65% by mass or more, particularly preferably 70% by mass or more with respect to the whole amount of the organic solvent. The upper limit thereof is not particularly determined but 100% by mass or less, practically 99% by mass or less.

The organic solvent is a compound different from the above-mentioned characteristic improving agents [1] and [2], and a compound contained in the characteristic improving agents [1] and [2] is excluded. Also, the after-mentioned polymerizable compound is excluded. From this viewpoint, more specifically, the organic solvent is preferably a solvent which has no substituent having a fluorine atom, and is such that sulfur is not incorporated into the ring structure when the solvent is a ring compound. Further, the organic solvent is preferably composed of a compound containing an atom selected from a carbon atom, a hydrogen atom, an oxygen atom, a nitrogen atom, a phosphorus atom and a boron atom.

A preferable compound as the solvent with a melting point of 10° C. or less is a compound having at least one selected from an ester structure, a carbonate structure, an ether structure, a nitrile structure, a phosphate structure, an amide structure, a sulfate structure, a sulfite structure, an aromatic structure and a sulfide structure, and is also preferably a compound having these structures by plurality. Among these, a compound having a chain carbonate structure and a ring ester structure is preferable.

Examples of more preferable solvent with a melting point of 10° C. or less (the inside of parentheses is the melting point) include an ester compound (preferably methyl acetate (−98° C.), ethyl acetate (−83° C.), propyl acetate (−92° C.)), a ring ester compound (preferably γ-butyrolactone (−44° C.), γ-valerolactone (−31° C.), δ-valerolactone (−13° C.), ε-caprolactone (−1° C.), γ-hexanolactone (−18° C.)), a chain carbonate compound (preferably dimethyl carbonate (4° C.), diethyl carbonate (−43° C.), ethylmethyl carbonate (−55° C.)), a ring carbonate compound (preferably propylene carbonate (−48° C.)), a chain ether compound (preferably dimethoxymethane (−105° C.), 1,2-dimethoxyethane (−58° C.), 1,2-diethoxyethane (−74° C.), diethylene glycol dimethyl ether (−64° C.), triethylene glycol dimethyl ether (−45° C.)), a ring ether compound (preferably tetrahydrofuran (−108° C.), 1,3-dioxolane (−95° C.), tetrahydropyran (−45° C.)), a nitrile compound (preferably acetonitrile (−45° C.), propionitrile (−93° C.), adiponitrile (1° C.), valeronitrile (−96° C.)), a phosphate compound (preferably trimethyl phosphate (−46° C.)), a sulfate compound (preferably dimethyl sulfate (−32° C.)), and an amide compound (preferably dimethylacetamide (−20° C.), N-methylpyrrolidone (−23° C.)).

Among these, the solvent particularly preferably contains dimethyl carbonate, diethyl carbonate, ethylmethyl carbonate and γ-butyrolactone.

The more preferable embodiment of the solvent with a melting point of 10° C. or less is such as to contain at least one of a compound with a melting point of 0° C. or less. The compound with a melting point of 0° C. or less is preferably contained by 50% by mass or more and 100% by mass or less, more preferably by 80% by mass or more and 100% by mass or less with respect to the whole amount of the solvent with a melting point of 10° C. or less. A solvent more preferably with a melting point of −20° C. or less, furthermore preferably with a melting point of −40° C. or less is contained by 50% by mass or more and 100% by mass or less. In particular, at least one of diethyl carbonate, ethylmethyl carbonate and γ-butyrolactone is preferably contained, particularly preferably by 50% by mass or more and 100% by mass or less. Thus, battery characteristics may be restrained from deteriorating even at lower temperature.

The organic solvent may contain a solvent with a melting point of more than 10° C. in addition to the solvent with a melting point of 10° C. or less. Examples of the solvent with a melting point of more than 10° C. include ethylene carbonate, 1,4-dioxane, 3-methyl-2-oxazolidinone, dimethyl sulfone, ethylmethyl sulfone, dimethyl sulfoxide and diphenyl ether, preferably ethylene carbonate.

(Electrolyte Salt)

The liquid electrolyte of the present invention contains an electrolyte salt, and preferably contains a metal ion or a salt thereof which belongs to the elements of Group I or the elements of Group II of the Periodic Table. For example, lithium salts, potassium salts, sodium salts, calcium salts, and magnesium salts can be mentioned. In a case where the liquid electrolyte is used in a secondary battery or the like, from the viewpoint of the output power of the secondary battery, a lithium salt is preferred. In a case of using the liquid electrolyte of the present invention as the electrolyte of a non-aqueous liquid electrolyte for lithium secondary batteries, it is desirable to select a lithium salt as the salt of the metal ion. The lithium salt is not particularly limited as long as it is a lithium salt that is usually used in the electrolyte of a non-aqueous liquid electrolyte for lithium secondary batteries, but for example, the salts described below are preferred.

(L-1) Inorganic lithium salt: inorganic fluoride salt such as $LiPF_6$, $LiBF_4$, $LiAsF_6$, $LiSbF_6$; perhalogenic acid salts such as $LiClO_4$, $LiBRO_4$, $LiIO_4$; and inorganic chloride salt such as $LiAlCl_4$, and the like.

(L-2) Organic lithium salt containing fluorine: perfluoroalkanesulfonic acid salt such as $LiCF_3SO_3$; perfluoroalkanesulfonylimide salts such as $LiN(CF_3SO_2)_2$, $LiN(CF_3CF_2SO_2)_2$, $LiN(FSO_2)_2$, and $LiN(CF_3SO_2)(C_4F_9SO_2)$; perfluoroalkanesulfonylmethide salts such as $LiC(CF_3SO_2)_3$; fluoroalkyl fluorophosphoric acid salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$, and the like.

(L-3) Oxalatoborate salts: lithium bis(oxalate)borate, lithium difluoro(oxalate)borate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)_2$, are preferred; and lithium imide salts such as $LiPF_6$, $LiBF_4$, $LiN(Rf^1SO_2)_2$, $LiN(FSO_2)_2$ and $LiN(Rf^1SO_2)(Rf^2SO_2)_2$ are more preferred. Herein, $Rf^1$ and $Rf^2$ each represent a perfluoroalkyl group.

Meanwhile, as for the lithium salt that is used in the liquid electrolyte, one kind may be used alone, or any two or more kinds may be used in combination.

The content of the electrolyte salt in the liquid electrolyte is usually 5 to 30 parts by mass with respect to 100 parts by mass of an organic solvent, and the viscosity of the liquid electrolyte becomes so higher as the salt concentration becomes higher that a proper ion concentration range exists for exhibiting high ion conductivity. The proper ion concentration range is preferably adjusted so as to be 0.5 mol/L to 1.5 mol/L when evaluated as the ion concentration.

(Other Components)

The liquid electrolyte of the present invention may contain at least one selected from the group consisting of a polymerizable compound, a flame retardant and an overcharge preventing agent. The content ratio of these functional additives in the non-aqueous liquid electrolyte is not particularly limited but is each preferably 0.001% by mass to 10% by mass with respect to the whole non-aqueous liquid electrolyte. The addition of these compounds allows rupture and ignition of a battery to be restrained during disorder due to overcharge, and allows capacity maintenance characteristics and cycling characteristics to be improved after preserving at high temperature.

(Polymerizable Compound)

The kind of a polymerizable compound that can be used in the present invention is not particularly determined unless it deviates from the purport of the present invention, but examples thereof include a radical polymerizable compound, an anionic polymerizable compound and a cationic polymerizable compound, preferably a radical polymerizable compound and/or an anionic polymerizable compound. Incidentally, a compound corresponding to the above-mentioned characteristic improving agents [1] and [2] is not included in the polymerizable compound described herein.

The radical polymerizable compound and the anionic polymerizable compound are preferably a compound having a carbon-carbon multiple bond. Examples of the compound having a carbon-carbon multiple bond include a vinyl compound, a styrene derivative, a (meth)acrylate derivative, and a cyclic olefin (optionally containing a hetero atom in a ring). A compound having a carbon-carbon multiple bond and a polar functional group is more preferable, and examples of the polar functional group include an ester group, a carbonate group, a nitrile group, an amide group, an urea group, a sulfolane group, a sulfoxide group, a sulfone group, a sulfonate, a cyclic ether group and a polyalkylene oxide group. These polar groups may form a chain structure or a ring structure.

Examples of the cationic polymerizable compound include an epoxy compound, an oxetane compound; and a vinyl ether compound.

Among them, a compound with a structure represented by any of the following formulae (3-a) to (3-d) is used particularly preferably.

Formula (3-a)

Formula (3-b)

Formula (3-c)

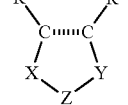

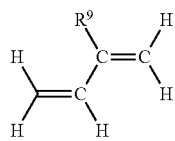

Formula (3-d)

The dotted line of the formula (3-c) signifies a single bond or a double bond.

$R^3$ $R^3$ of the above-mentioned formula (3-a) denotes a hydrogen atom or an alkyl group. The alkyl group preferable as $R^3$ is an alkyl group with a carbon number of 1 to 10 (such as methyl, ethyl, hexyl and cyclohexyl), and $R^3$ is more preferably a hydrogen atom.

$R^4$ $R^4$ of the formula (3-a) denotes an aromatic group, a heterocyclic group, a cyano group, an alkoxy group or an acyloxy group. The aromatic group of $R^4$ is preferably a $2\pi$ aromatic group with a carbon number of 6 to 10 (such as phenyl and naphtyl), the heterocyclic group is preferably a heteroaromatic group with a carbon number of 4 to 9 (such as furyl, pyridyl, pyrazyl, pyrimidyl and quinolyl), the alkoxy group is preferably an alkoxy group with a carbon number of 1 to 10 (such as methoxy, ethoxy and butoxy), the acyloxy group is preferably an acyloxy group with a carbon number of 1 to 10 (such as an acetyl group and a hexanoyloxy group), and $R^4$ of the formula (3-a) is more preferably a phenyl group.

$R^5$ $R^5$ of the formula (3-b) denotes a hydrogen atom, an alkyl group or a cyano group; the alkyl group is preferably an alkyl group with a carbon number of 1 to 10 (such as methyl, ethyl, hexyl and cyclohexyl), more preferably a hydrogen atom or a methyl group.

$R^6$ $R^6$ of the formula (3-b) denotes an alkyl group, an alkoxy group or an amino group, more preferably an alkoxy group, that is, the compound represented by formula (3-b) is acrylate or methacrylate. The alkoxy group corresponding to an alcohol portion of ester in this case is preferably an alkoxy group with a carbon number of 1 to 10 (such as methoxy, ethoxy and butoxy), more preferably a methoxy group or an ethoxy group.

$R^7$ and $R^8$ $R^7$ and $R^8$ of the formula (3-c) denote a hydrogen atom, an alkyl group, an alkenyl group or an aromatic group. However, when . . . in the formula is a single bond, either of $R^7$ and $R^8$ is an alkenyl group. At this time, the rest of $R^7$ and $R^8$ is preferably a hydrogen atom. When . . . in the formula is a double bond, it is preferable that $R^7$ and $R^8$ are hydrogen atoms, or $R^7$ is a hydrogen atom and $R^8$ is an aromatic group. The aromatic group in this case is more preferably an aromatic group with a carbon number of 6 to 10 (such as phenyl and naphtyl).

X, Y and Z

X, Y and Z of the formula (3-c) denote a divalent linking group selected from —O—, —(C=O)— and —NR—, which may form a 5- or 6-membered ring; preferably, X and Y are —O— and Z is —(C=O)—. The above-mentioned R denotes an alkyl group or an aromatic group. A preferable alkyl group signifies the same as that of $R^3$ and a preferable aromatic group signifies the same as that of $R^4$.

$R^9$

In formula (3-d), $R^9$ represents a hydrogen atom or an alkyl group, preferably a hydrogen atom or an alkyl group having 1 to 10 carbon atoms (e.g., methyl, ethyl, hexyl, or cyclohexyl), and more preferably a hydrogen atom or a methyl group.

The above-described substituents of $R^3$ to $R^9$ may further contain another substituent.

Preferable substituents include the above-described substituent T.

When a compound, a substituent or the like contains an alkyl group, an alkenyl group or the like, these groups may be linear or branched, and may be substituted or unsubstituted. Furthermore, when the compound, substituent or the like contains an aryl group, a heterocyclic group or the like, they may be monocyclic or fused-cyclic, and may be substituted or unsubstituted.

It is noted that in the present specification, the representation of the compound is used in the sense that not only the compound itself, but also its salt, its complex, and its ion are incorporated therein. Further, it is used in the sense that the compound includes a derivative thereof which is modified in a predetermined part in the range of achieving a desired effect.

Examples of the polymerizable compound are described below. However, the present invention is not construed by being limited thereto.

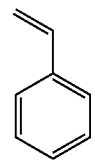

J-1

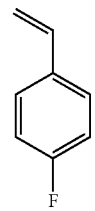

J-2

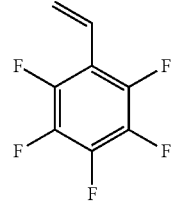

J-3

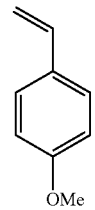

J-4

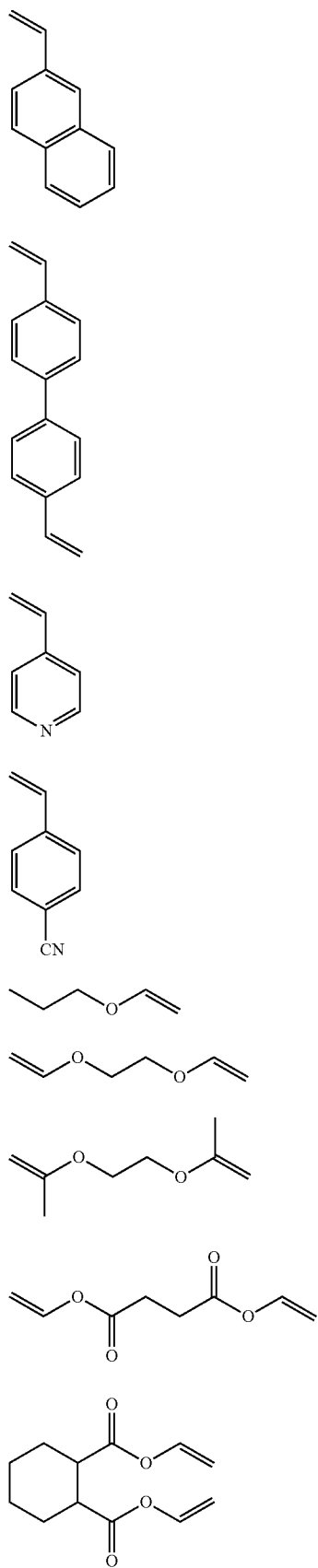
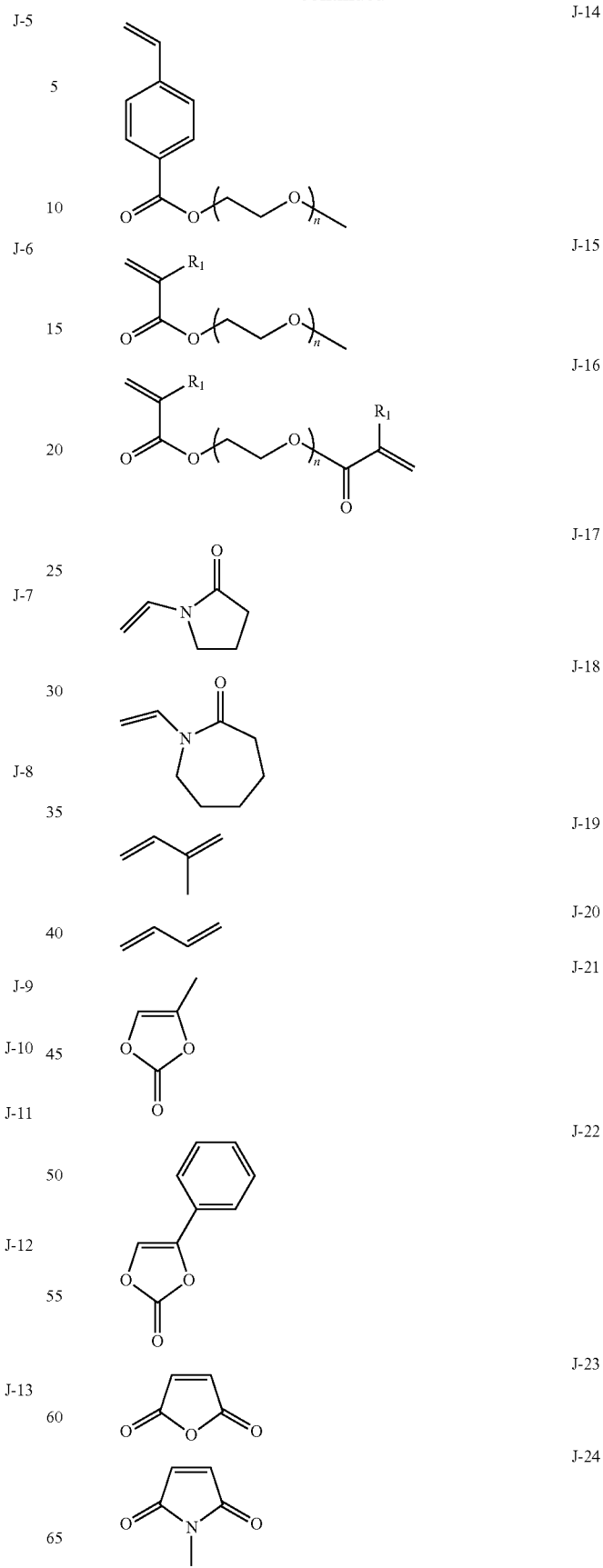

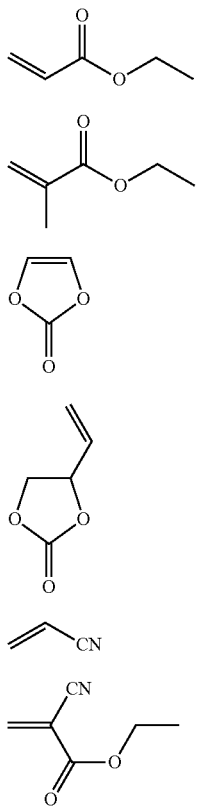

R₁ represents a hydrogen atom, an alkyl group, a halogen atom, or a cyano group.

n represents an integer of 1 to 20.

The addition of the polymerizable compound is optional; in the case where the addition is small in amount, the effect of improving cycling characteristics becomes small, and in the case where the addition is too large in amount, internal resistance of a battery increases, so that the initial characteristics of a battery are occasionally deteriorated. A concentration range thereof is each 0.001% by mass to 10% by mass, and preferable content is 0.001% by mass to 5% by mass, more preferably 0.01% by mass to 1% by mass, far more preferably 0.05% by mass to 0.5% by mass.

(Other Additives)

In the liquid electrolyte of the present invention, various additives can be used in accordance with the purpose in order to enhance the performance of the battery, to the extent that the effect of the present invention is not impaired. As for such additives, functional additives such as an overcharge preventing agent, a negative electrode film forming agent, a positive electrode protective agent, and a flame retardant may be used.

Furthermore, a combined use of the negative electrode film forming agent and the positive protective agent, or a combined use of the overcharge preventing agent, the negative electrode film forming agent, and the positive electrode protective agent is particularly preferred.

[Producing Method of Liquid Electrolyte]

Next, a representative method for preparing the liquid electrolyte of the present invention will be described by taking the case of using a lithium salt as the salt of a metal ion, as an example.

The liquid electrolyte of the present invention is prepared by dissolving the aforementioned components in the non-aqueous liquid electrolyte solvent.

Filtering step is preferably included for removing foreign matter, and may be performed in each component or after mixing a plurality or all of these components.

The term "non-aqueous" as used in the present invention means that water is substantially not contained, and a small amount of water may be contained as long as the effects of the present invention are not impaired. In consideration of obtaining good properties, water is preferably contained in an amount of up to 200 ppm and more preferably up to 100 ppm. Although the lower limit is not particularly restricted, it is practical for the water content to be 10 ppm or more in consideration of inevitable incorporation.

Although the viscosity of the liquid electrolyte of the present invention is not particularly limited, the viscosity at 25° C. is preferably 10 to 0.1 mPa·s, more preferably 5 to 0.5 mPa·s.

[Secondary Battery]

A second embodiment of the present invention is a non-aqueous secondary battery containing the above-mentioned non-aqueous liquid electrolyte of the present invention. A preferable embodiment is described while referring to FIG. 1 schematically illustrating a mechanism of a lithium ion secondary battery. The lithium ion secondary battery 10 of the present embodiment includes the above-described non-aqueous liquid electrolyte 5 for a secondary battery of the present invention, a positive electrode C (current collector for positive electrode 1, positive electrode active material layer 2) capable of insertion and release of lithium ions, and a negative electrode A (current collector for negative electrode 3, negative electrode active material layer 4) capable of insertion and discharge, or dissolution and precipitation, of lithium ions. In addition to these essential members, the lithium secondary battery may also be constructed to include a separator 9 that is disposed between the positive electrode and the negative electrode, current collector terminals (not shown), and an external case (not shown), in consideration of the purpose of using the battery, the form of the electric potential, and the like. According to the necessity, a protective element may also be mounted in at least any one side of the interior of the battery and the exterior of the battery. By employing such a structure, transfer of lithium ions a and b occurs in the liquid electrolyte 5, and charging a and discharging 13 can be carried out. Thus, operation and accumulation can be carried out by means of an operating means 6 through the circuit wiring 7. The configuration of the lithium secondary battery, which is a preferable embodiment of the present invention, will be described in detail below.

(Battery Shape)

There are no particular limitations on the battery shape that is applied to the lithium secondary battery of the present embodiment, and examples of the shape include a bottomed cylindrical shape, a bottomed rectangular shape, a thin flat shape, a sheet shape, and a paper shape. The lithium secondary battery of the present embodiment may have any of these shapes. Furthermore, an atypical shape such as a horseshoe shape or a comb shape, which is designed in consideration of the form of the system or device into which the lithium secondary battery is incorporated, may also be used. Among them, from the viewpoint of efficiently releasing the heat inside of the battery to the outside thereof, a rectangular shape such as a bottomed rectangular shape or a thin flat shape, which has at least one relatively flat and large-sized surface, is preferred.

In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18.

With regard to the bottomed rectangular shape, it is preferable that the value of the ratio of twice the area of the largest surface, S (the product of the width and the height of the external dimension excluding terminal areas, unit: cm$^2$) and the external thickness of the battery, T (unit: cm), 2 S/T, be 100 or greater, and more favorably 200 or greater. By having the largest surface made large, even in the case of batteries of high output power and large capacity, characteristics such as cycle characteristics and high temperature storage can be enhanced, and also, the heat dissipation efficiency at the time of abnormal heat generation can be increased. Thus, it is advantageous from the viewpoint that "valve action" or "bursting", which will be described below, can be prevented.

(Battery-Constituting Members)

The lithium secondary battery of the present embodiment is constituted to include the liquid electrolyte 5, an electrode mixture of a positive electrode C and a negative electrode A, and basic member of the separator 9, based on FIG. 1. These various members will be described below. The lithium secondary battery of the present invention includes at least the non-aqueous liquid electrolyte for batteries of the present invention as the liquid electrolyte.

(Electrode Mixtures)

An electrode mixture is a composite obtained by applying an active substance, and a dispersion of an electroconductive agent, a binder, a filler and the like on a current collector (electrode substrate). For a lithium battery, a positive electrode mixture in which the active substance is a positive electrode active substance, and a negative electrode mixture in which the active substance is a negative electrode active substance are usually used. Next, each component in dispersions composing the electrode mixture (composition for electrode) is described.

Positive Electrode Active Substance

A particulate positive electrode active substance may be used in the electrode mixture for a secondary battery. As the positive electrode active substance, a transition metal oxide which is capable of reversible insertion and release of lithium ions can be used, but it is preferable to use a lithium-containing transition metal oxide. Suitable examples of a lithium-containing transition metal oxide that is preferably used as a positive electrode active substance, include oxides containing one or more of lithium-containing Ti, lithium-containing V, lithium-containing Cr, lithium-containing Mn, lithium-containing Fe, lithium-containing Co, lithium-containing Ni, lithium-containing Cu, lithium-containing Mo, and lithium-containing W. Furthermore, alkali metals other than lithium (elements of Group 1 (Ia) and Group 2 (IIa) of the Periodic Table of Elements), and/or Al, Ga, In, Ge, Sn, Pb, Sb, Bi, Si, P, B and the like may also be incorporated. The amount of incorporation is preferably from 0 mol % to 30 mol % relative to the amount of the transition metal. Among these, the use of an oxide containing Ni as a positive electrode active substance causes the effect of the present invention to be remarkable.

Among the lithium-containing transition metal oxides that are preferably used as the positive electrode active substance, a substance synthesized by mixing a lithium compound and a transition metal compound (herein, the transition metal refers to at least one selected from Ti, V, Cr, Mn, Fe, Co, Ni, Mo, and W) such that the total molar ratio of lithium compound/transition metal compound is 0.3 to 2.2.

Furthermore, among the lithium compound/transition metal compound, materials containing $Li_gM3O_2$ (wherein M3 represents one or more elements selected from Co, Ni, Fe, and Mn; and g represents 0 to 1.2), or materials having a spinel structure represented by $Li_hM4_2O$ (wherein M4 represents Mn; and h represents 0 to 2) are particularly preferred. As M3 and M4 described above, Al, Ga, In, Ge, Sn, Pb, Sb, Bi, Si, P, B, or the like may also be incorporated in addition to the transition metal. The amount of incorporation is preferably from 0 mol % to 30 mol % relative to the amount of the transition metal.

Among the materials containing $Li_gM3O_2$ and the materials having a spinel structure represented by $Li_hM4_2O_4$, $Li_gCoO_2$, $Li_gNiO_2$, $Li_gMnO_2$, $Li_gCo_jNi_{1-j}O_2$, $Li_hMn_2O_4$, $LiNi_jMn_{1-j}O_2$, $LiCo_jNi_hAl_{1-j-h}O_2$, $LiCo_jNi_hMn_{1-j-h}O_2$, $LiMn_hAl_{2-h}O_4$, and $LiMn_hNi_{2-h}O_4$ (wherein in the respective formulas, g represents 0.02 to 1.2; j represents 0.1 to 0.9; and h represents 0 to 2) are particularly preferred; and $Li_gCoO_2$, $Li_hMn_2O_4$, $LiCo_jNi_hAl_{1-j-h}O_2$, $LiCo_jNi_hMn_{1-j-h}O_2$, $LiMn_hAl_{2-h}O_4$, $LiMn_hNi_2$— are most preferred. From the viewpoints of high capacity and high power output, among those described above, an electrode containing Ni is more preferred. Herein, the g value and the h value are values prior to the initiation of charging and discharging, and are values that increase or decrease as charging or discharging occurs. Specific examples thereof include $LiCoO_2$, $LiNi_{0.85}Co_{0.01}Al_{0.05}O_2$, $LiNi_{0.33}Co_{0.33}Mn_{0.33}O_2$, $LiMn_{1.8}Al_{0.2}O_4$ and $LiMn_{1.5}Ni_{0.5}O_4$.

Preferred examples of the transition metal of the lithium-containing transition metal phosphate compound include V, Ti, Cr, Mn, Fe, Co, Ni, and Cu, and specific examples of the compound include iron phosphates such as $LiFePO_4$, $Li_3Fe_2(PO_4)_3$, and $LiFeP_2O_7$; cobalt phosphates such as $LiCoPO_4$; and compounds in which a portion of the transition metal atoms that constitute the main component of these lithium-transition metal phosphate compounds has been substituted by another metal such as Al, Ti, V, Cr, Mn, Fe, Co, Li, Ni, Cu, Zn, Mg, Ga, Zr, Nb, or Si.

The average particle size of the positive electrode active substance used in the non-aqueous electrolyte secondary battery of the present invention is not particularly limited, but the average particle size is preferably from 0.1 μm to 50 μm. The specific surface area is not particularly limited, but specific surface area as measured by the BET method is preferably from 0.01 m$^2$/g to 50 m$^2$/g. Furthermore, the pH of the supernatant obtainable when 5 g of the positive electrode active substance is dissolved in 100 mL of distilled water is preferably from 7 to 12.

In order to adjust the positive electrode active substance to a predetermined particle size, a well-known pulverizer or classifier may be used. For example, a mortar, a ball mill, a vibrating ball mill, a vibrating mill, a satellite ball mill, a planetary ball mill, a swirling air flow jet mill, or a sieve is used. The positive electrode active substance obtained according to the calcination method may be used after washing the substance with water, an acidic aqueous solution, an alkaline aqueous solution, or an organic solvent.

Negative Electrode Active Substance

There are no particular limitations on the negative electrode active substance, as long as the negative electrode active substance is capable of reversible insertion and release of lithium ions, and examples thereof include carbonaceous materials, metal oxides such as tin oxide and silicon oxide, metal composite oxides, simple lithium substance or lithium alloys such as a lithium-aluminum alloy, and metals capable of forming an alloy with lithium, such as Sn and Si.

For these materials, one kind may be used alone, or two or more kinds may be used in any combination at any proportions. Among them, carbonaceous materials or lithium composite oxides are preferably used from the viewpoint of safety.

Furthermore, the metal composite oxides are not particularly limited as long as the materials are capable of adsorption and release of lithium, but it is preferable for the composite oxides to contain titanium and/or lithium as constituent components, from the viewpoint of high current density charging-discharging characteristics.

A carbonaceous material that is used as a negative electrode active substance is a material which is substantially composed of carbon. Examples thereof include petroleum pitch, natural graphite, artificial graphite such as vapor-grown graphite, and carbonaceous materials obtained by firing various synthetic resins such as PAN-based resins and furfuryl alcohol resins. Further, the examples include various carbon fibers such as PAN-based carbon fibers, cellulose-based carbon fibers, pitch-based carbon fibers, vapor-grown carbon fibers, dehydrated PVA-based carbon fibers, lignin carbon fibers, vitreous carbon fibers, and activated carbon fibers; mesophase microspheres, graphite whiskers, and tabular graphite.

These carbonaceous materials may be classified into hardly graphitized carbon materials and graphite-based carbon materials, according to the degree of graphitization. Also, it is preferable that the carbonaceous materials have the plane spacing, density, and size of crystallites described in JP-A-62-22066, JP-A-2-6856, and JP-A-3-45473. The carbonaceous materials are not necessarily single materials, and a mixture of natural graphite and an artificial graphite as described in JP-A-5-90844, a graphite having a coating layer as described in JP-A-6-4516, and the like can also be used.

In regard to the metal oxides and metal composite oxides that are negative electrode active substances used in the non-aqueous secondary battery, at least one of these may be included. The metal oxides and metal composite oxides are particularly preferably amorphous oxides, and furthermore, chalcogenides which are reaction products of metal elements and the elements of Group 16 of the Periodic Table of Elements are also preferably used. The term amorphous as used herein means that the substance has a broad scattering band having an apex at a 2θ value in the range of 20° to 40°, as measured by an X-ray diffraction method using CuKα radiation, and the substance may also have crystalline diffraction lines. The highest intensity obtainable among the crystalline diffraction lines exhibited at a 2θ value in the range of from 40° to 70° is preferably 100 times or less, and more preferably 5 times or less, than the diffraction line intensity of the apex of the broad scattering band exhibited at a 2θ value in the range of from 20° to 40°, and it is particularly preferable that the substance does not have any crystalline diffraction line.

Among the group of compounds composed of the amorphous oxides and chalcogenides, amorphous oxides and chalcogenides of semi-metallic elements are more preferred, and oxides and chalcogenides formed from one kind alone or combinations of two or more kinds of the elements of Group 13 (IIIB) to Group 15 (VB) of the Periodic Table of Elements, Al, Ga, Si, Sn, Ge, Pb, Sb and Bi are particularly preferred. Specific preferred examples of the amorphous oxides and chalcogenides include, for example, $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$ as for metal compounds. Furthermore, these may also be composite oxides with lithium oxide, for example, $Li_2SnO_2$.

The average particle size of the negative electrode active substance used in the non-aqueous secondary battery of the present invention is preferably from 0.1 μm to 60 μm. In order to adjust the negative electrode active substance to a predetermined particle size, a well-known pulverizer or classifier may be used. For example, a mortar, a ball mill, a sand mill, a vibrating ball mill, a satellite ball mill, a planetary ball mill, a swirling air flow jet mill, and a sieve are favorably used. At the time of pulverization, wet pulverization of using water or an organic solvent such as methanol to co-exist with the negative electrode active substance can also be carried out as necessary. In order to obtain a desired particle size, it is preferable to perform classification. There are no particular limitations on the classification method, and a sieve, an air classifier or the like can be used as necessary. Classification may be carried out by using a dry method as well as a wet method.

The chemical formula of the compound obtained by the calcination method can be obtained by using an inductively coupled plasma (ICP) emission spectroscopic method as a measurement method, and computed from the mass difference of the powder measured before and after calcination, as a convenient method.

In the present invention, suitable examples of the negative electrode active substance that can be used together with the amorphous oxide negative electrode active substances represented by Sn, Si and Ge, include carbon materials that are capable of adsorption and release of lithium ions or lithium metal, as well as lithium, lithium alloys, and metal capable of alloying with lithium.

In the present invention, it is preferable to use lithium titanate, more specifically lithium titanium oxide ($Li[Li_{1/3}Ti_{5/3}]O_4$), as an active material of the negative electrode. When this is used as a negative electrode active material, the effects of the present invention are remarkably exhibited.

Electroconductive Material

As for the electroconductive material, any material may be used as long as it is an electron conductive material which does not cause a chemical change in a constructed secondary battery, and any known electroconductive material can be used. Usually, electroconductive materials such as natural graphite (scale-like graphite, flaky graphite, earthly graphite, and the like), artificial graphite, carbon black, acetylene black, Ketjen black, carbon fibers, metal powders (copper, nickel, aluminum, silver (described in JP-A-63-10148, 554), and the like), metal fibers, and polyphenylene derivatives (described in JP-A-59-20,971) can be incorporated alone or as mixtures thereof. Among them, a combination of graphite and acetylene black is particularly preferred. The amount of addition of the electroconductive agent is preferably from 0.1 mass % to 50 mass %, and more preferably from 0.5 mass % to 30 mass %. In the case of carbon or graphite, the amount of addition is particularly preferably from 0.5 mass % to 15 mass %.

Binder

In the present invention, it is preferable that a binder for retaining the electrode mixture described above is used.

Preferred examples of the binder include polysaccharides, thermoplastic resins, and polymers having rubber elasticity, and among them, preferred examples include emulsions (latexes) or suspensions of starch, carboxymethyl cellulose, cellulose, diacetyl cellulose, methyl cellulose, hydroxyethyl cellulose, hydroxypropyl cellulose, sodium alginate; water-soluble polymers such as poly(acrylic acid), poly(sodium acrylate), polyvinylphenol, poly(vinyl methyl ether), poly(vinyl alcohol), polyvinylpyrrolidone, polyacrylonitrile, polyacrylamide, poly(hydroxy(meth)acrylate), and a styrene-maleic acid copolymer; poly(vinyl chloride), polytetrafluoroethylene, poly(vinylidene fluoride), a tetrafluoroethylene-hexafluoropropylene copolymer, a vinylidene fluoride-tetrafluoroethylene-hexafluoropropylene copolymer, polyethylene, polypropylene, an ethylene-propylene-diene terpolymer (EPDM), a sulfonated EPDM, a poly(vinyl acetal) resin, (meth)acrylic acid ester copolymers containing (meth)acrylic acid esters such as methyl methacrylate and 2-ethylhexyl acrylate, a (meth)acrylic acid ester-acrylonitrile copolymer, a poly(vinyl ester) copolymer containing a vinyl ester such as vinyl acetate, a styrene-butadiene copolymer, an acrylonitrile-butadiene copolymer, polybutadiene, a neoprene rubber, a fluorine rubber, poly(ethylene oxide), a polyester polyurethane resin, a polyether polyurethane resin, a polycarbonate polyurethane resin, a polyester resin, a phenolic resin, and an epoxy resin. More preferred examples include a poly(acrylic acid ester)-based latex, carboxymethyl cellulose, polytetrafluoroethylene, and poly(vinylidene fluoride).

As for the binder, one kind may be used alone, or two or more kinds may be used as mixtures. If the amount of addition of the binder is small, the retention power and the aggregating power of the electrode mixture are weakened. If the amount of addition is too large, the electrode volume increases, and the capacity per unit volume or unit mass of the electrode is decreased. For such reasons, the amount of addition of the binder is preferably from 1 mass % to 30 mass %, and more preferably from 2 mass % to 10 mass %.

Filler

The electrode mixture may contain a filler. Regarding the material that forms the filler, any fibrous material that does not cause a chemical change in the secondary battery of the present invention can be used. Usually, fibrous fillers formed from olefinic polymers such as polypropylene and polyethylene, and materials such as glass and carbon are used. The amount of addition of the filler is not particularly limited, but the amount of addition is preferably from 0 mass % to 30 mass %.

Current Collector

As the current collector for the positive and negative electrodes, an electron conductor that does not cause a chemical change in the non-aqueous electrolyte secondary battery of the present invention is used. Preferred examples of the current collector for the positive electrode include aluminum, stainless steel, nickel, and titanium, as well as aluminum or stainless steel treated with carbon, nickel, titanium, or silver on the surface. Among them, aluminum and aluminum alloys are more preferred.

Preferred examples of the current collector for the negative electrode include aluminum, copper, stainless steel, nickel, and titanium, and more preferred examples include aluminum, copper and copper alloys.

Regarding the shape of the current collector, a film sheet-shaped current collector is usually used, but a net-shaped material, a film sheet formed by punching, a lath material, a porous material, a foam, a material obtained by molding a group of fibers, and the like can also be used. The thickness of the current collector is not particularly limited, but the thickness is preferably from 1 μm to 500 μm. Furthermore, it is also preferable to provide surface unevenness on the surface of the current collector through a surface treatment.

Electrode mixtures for lithium secondary batteries are formed by members appropriately selected from these materials.

(Separator)

The separator used in the non-aqueous secondary battery of the present invention is not particularly limited as long as the separator is formed of a material which electronically insulates the positive electrode and the negative electrode, and has mechanical strength, ion permeability, and oxidation-reduction resistance at the surfaces in contact with the positive electrode and the negative electrode. Examples of such a material that may be used include porous polymer materials or inorganic materials, organic-inorganic hybrid materials, and glass fibers. These separators preferably have a shutdown function for securing safety, that is, a function of increasing resistance by blocking the voids at 80° C. or more, and thereby cutting off the electric current, and the blocking temperature is preferably from 90° C. to 180° C.

The shape of the pores of the separator is usually circular or elliptical, and the size is from 0.05 μm to 30 μm, and preferably from 0.1 μm to 20 μm. Furthermore, as in the case of producing the material by an extension method or a phase separation method, a material having rod-shaped or irregularly shaped pores may also be used. The proportion occupied by these pores, that is, the pore ratio, is 20% to 90%, and preferably 35% to 80%.

Regarding the polymer materials described above, a single material such as cellulose nonwoven fabric, polyethylene, or polypropylene may be used, or a compositized material of two or more kinds may also be used. A laminate of two or more kinds of finely porous films that are different in the pore size, pore ratio, pore blocking temperature and the like, is preferred.

As the inorganic material, oxides such as alumina and silicon dioxide, nitrides such as aluminum nitride and silicon nitride, and sulfates such as barium sulfate and calcium sulfate are used, and a particle-shaped or fiber-shaped material is used. Regarding the form, a thin film-shaped material such as a nonwoven fabric, a woven fabric, or a finely porous film is used. In the case of a thin film-shaped material, a material having a pore size of from 0.01 μm to 1 μm and a thickness of from 5 μm to 50 μm is favorably used. In addition to the independent thin film-shaped materials described above, a separator obtained by forming a composite porous layer containing particles of the inorganic substance described above, as a surface layer of the positive electrode and/or the negative electrode by using a binder made of a resin, can be employed. For example, a separator in which alumina particles having a 90% particle size of less than 1 μm are formed on both surfaces of the positive electrode as porous layers by using a binder of a fluororesin, may be used.

(Preparation of Non-Aqueous Secondary Battery)

As the shape of the non-aqueous secondary battery of the present invention, any form such as a sheet form, a rectangular form, or a cylindrical form can be applied as described above. The mixture of the positive electrode active substance or the negative electrode active substance is mainly used after being applied (coated) on a current collector, dried, and compressed.

Hereinafter, a bottomed cylindrical lithium secondary battery 100 will be taken as an example, and its configuration and a production method thereof will be described with reference to FIG. 2. In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18. In addition, reference numeral 20 in the diagram represents an insulating plate, 22 represents an opening sealing plate, 24 represents a positive electrode current collector, 26 represents a gasket, 28 represents a pressure-sensitive valve body, and 30 represents a current blocking element. Meanwhile, the diagram inside the magnified circle is indicated with varying hatchings in consideration of visibility, but the various members are equivalent to the overall diagram by the reference numerals.

First, a negative electrode active substance is mixed with a solution prepared by dissolving a binder, a filler and the like that are used as desired in an organic solvent, and thus a negative electrode mixture is prepared in a slurry form or in a paste form. The negative electrode mixture thus obtained is uniformly applied over the entire surface of both sides of a metal core as a current collector, and then the organic solvent is removed to form a negative electrode mixture layer. Furthermore, the laminate of the current collector and the negative electrode mixture layer is rolled by using a roll pressing machine or the like to produce a laminate having a predetermined thickness, and thereby, a negative electrode sheet (electrode sheet) is obtained. At this time, the application method for each agent, the drying of applied matter, and the formation method for positive and negative electrodes may conform to the usual method.

In the present embodiment, a cylindrical battery has been explained as an example, but the present invention is not limited to this. For example, positive and negative electrode sheets produced by the methods described above are superimposed with a separator interposed therebetween, and then the assembly may be processed directly into a sheet-like battery. Alternatively, a rectangular-shaped battery may be formed by folding the assembly, inserting the assembly into a rectangular can, electrically connecting the can with the sheet, subsequently injecting an electrolyte, and sealing the opening by using an opening sealing plate.

In all of the embodiments, a safety valve can be used as an opening sealing plate for sealing the opening. Furthermore, an opening sealing member may be equipped with various safety elements that are conventionally known, in addition to the safety valve. For example, as overcurrent preventing elements, a fuse, a bimetal, a PTC element and the like are favorably used.

Furthermore, as a countermeasure for an increase in the internal pressure of the battery can, a method of inserting a slit in the battery can, a gasket cracking method, an opening sealing plate cracking method, or a method of disconnecting from a lead plate can be used in addition to the method of providing a safety valve. Furthermore, a protective circuit incorporated with an overcharge-coping member or an overdischarge-coping member may be provided to a charging machine, or the aforementioned protective circuit may be provided independently.

For the can or the lead plate, a metal or an alloy having electrical conductibility can be used. For example, metals such as iron, nickel, titanium, chromium, molybdenum, copper, and aluminum, or alloys thereof are favorably used.

For the welding method that may be used when a cap, a can, a sheet, and a lead plate are welded, any known methods (for example, an electric welding method using a direct current or an alternating current, a laser welding method, an ultrasonic welding method, and the like) can be used. As the sealing agent for sealing an opening, any conventionally known compounds such as asphalt, and mixtures can be used.

[Use of Non-Aqueous Secondary Battery]

Non-aqueous secondary batteries of the present invention are applied to various applications since secondary batteries having satisfactory cycle characteristics can be produced.

There are no particular limitations on the application embodiment for the non-aqueous secondary battery, but in the case of mounting the non-aqueous secondary battery in electronic equipment, examples of the equipment include notebook computers, pen-input personal computers, mobile personal computers, electronic book players, mobile telephones, cordless phone handsets, pagers, handy terminals, portable facsimiles, portable copying machines, portable printers, headphone stereo sets, video movie cameras, liquid crystal television sets, handy cleaners, portable CDs, mini disc players, electric shavers, transceivers, electronic organizers, calculators, memory cards, portable tape recorders, radios, backup power supplies, and memory cards. Other additional applications for consumer use include automobiles, electromotive vehicles, motors, lighting devices, toys, game players, load conditioners, timepieces, strobes, cameras, and medical devices (pacemakers, hearing aids, shoulder massaging machines, and the like). Furthermore, the non-aqueous secondary battery can be used as various batteries for munition and space batteries. Also, the non-aqueous secondary battery can be combined with a solar cell.

EXAMPLES

Preparation of Liquid Electrolyte

An electrolyte salt shown in Table 1 was dissolved in an organic solvent so as to be 1 mol/L, and each component was mixed thereinto so as to be a ratio inside the parentheses to prepare a liquid electrolyte of the present invention and a liquid electrolyte for comparison.

Among Comparative Examples, the prescription of known compositions A to C is as follows.

<A>

| Solvent | |
|---|---|
| Ethylene carbonate | 60 mass % |
| Propylene carbonate | 40 mass % |

-continued

| Electrolyte salt | |
|---|---|
| LiPF$_6$ | 0.6 mol/L |
| Additive | |
| Benzophenone | 0.9% by mass in content with respect to solvent + electrolyte salt |

\<B\>

| Solvent | |
|---|---|
| Propylene carbonate | |
| Electrolyte salt | |
| LiClO$_4$ | 1.0 mol/L |
| Additive | |
| 9-Fluorenone | 0.02 mol/L |

\<C\>

| Solvent | |
|---|---|
| Monofluoro ethylene carbonate (mp: 17° C.) | |
| Electrolyte salt | |
| LiPF$_6$ | 0.6 mol/L |

Characteristic Improving Agent [1]

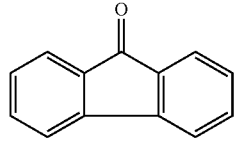
A1

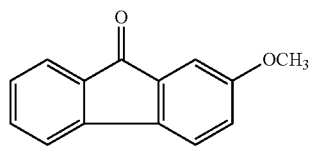
A2

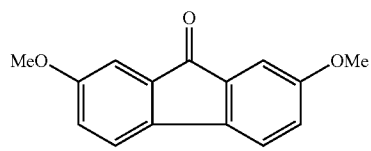
A3

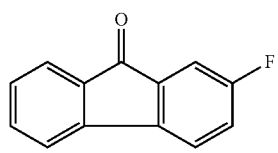
A4

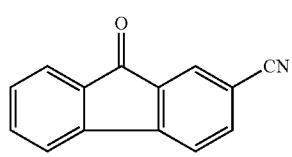
A5

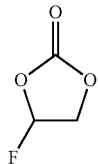
A6

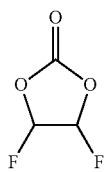
A7

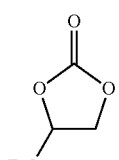
A8

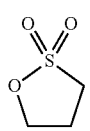
A9

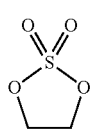

Characteristic Improving Agent [2]

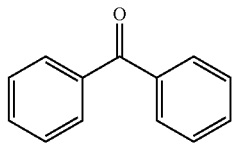
B1

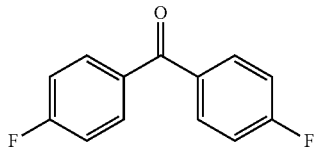
B2

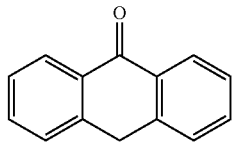
B3

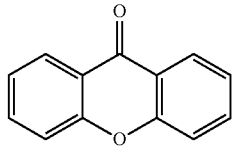
B4

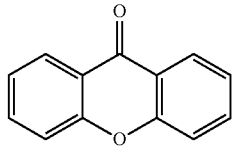
B5

-continued

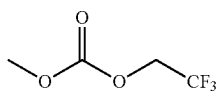 B6

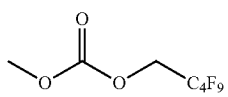 B7

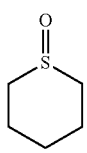 B8

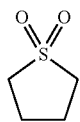 B9

 B10

Me represents a methyl group.
Solvent
Solvent having a melting point of 10° C. or less (mp≤10° C.)
  PC: Propylene carbonate (mp: −48° C.)
  BL: γ-butyrolactone (mp: −44° C.)
  DMC: Dimethyl carbonate (mp: 4° C.)
  DEC: Diethyl carbonate (mp: −43° C.)
  EMC: Ethyl methyl carbonate (mp: −55° C.)
  DME: 1,2-Dimethoxyethane (mp: −58° C.)
Solvent having a melting point of 10° C. more than (mp>10° C.)
  EC: Ethylene carbonate (mp: 38° C.)
Other Components Polymerizable compound

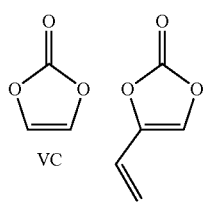

VC    VEC

[Evaluation 1 of Lithium Secondary Battery]
<Preparation of Battery (1)>

A positive electrode was produced by using an active material: lithium nickel manganese cobalt oxide ($LiNi_{1/3}Mn_{1/3}Co_{1/3}O_2$) 85% by mass, a conductive assistant: carbon black 7% by mass and a binder: PVDF 8% by mass, a negative electrode was produced by using an active material: lithium titanium oxide ($Li_4Ti_5O_{12}$) 94% by mass, a conductive assistant: carbon black 3% by mass and a binder: PVDF 3% by mass. A separator was 25 μm thick made of polypropylene. A 2032-type coin battery was produced for each test liquid electrolyte by using the above-mentioned positive and negative electrodes and separator to evaluate the following items. The results are shown in Table 1.

<Evaluation of Cycle Life Characteristic at High Temperature>

A 2032-type coin battery produced by the method described above was used, and in a thermostatic chamber at 45° C., the battery was subjected to constant current charging at 1 C until the battery voltage reached 2.65 V at 4.0 mA, subsequently to charging at a constant voltage of 2.65 V until the current value reached 0.12 mA or for 2 hours, and then to constant current discharging at 1 C until the battery voltage reached 1.2 V at 4.0 mA. This was defined as 1 cycle. This procedure was repeated up to 200th cycles. The cycle capacity maintaining ratio was calculated according to the following formula from discharge capacity (mAh) on 1st cycle and discharge capacity (mAh) on 200th cycle. A larger value brings smaller capacity deterioration and a favorable state even though charge and discharge are repeated at high temperature.

Cycle capacity maintaining ratio [$Cy$ ratio](%)=(Discharge capacity on 200$th$ cycle/Discharge capacity on 1$st$ cycle)×100

<Evaluation of Discharge Capacity at Low Temperature>

The discharge capacity rate at −20° C. against 30° C. was measured using a 2032-type coin battery produced by the method described above. In a thermostatic chamber at 30° C., the battery was subjected to constant current charging at 0.1 C until the battery voltage reached 2.65 V at 0.4 mA, to charging at a constant voltage of 2.65 V until the current value reached 0.12 mA or for 2 hours, and then to constant current discharging at 1 C in a thermostatic chamber at −20° C. or 30° C. until the battery voltage reached 1.2 V at 4 mA. Thus, the discharge capacity was measured and "Low temperature discharge capacity maintaining rate" was calculated according to the following formula. A larger value brings smaller capacity deterioration and a favorable state even at low temperature.

Low temperature discharge capacity maintaining rate [$Lt$ ratio](%)={(Discharge capacity at −20° C.)/(Discharge capacity at 30° C.)}×100

TABLE 1

| Test No. *2 | Characteristic improving agent [1] (mass part) *1 | Characteristic improving agent [2] (mass part) *1 | Electrolyte salt | Organic Solvent (mass %) *3 mp ≤10° C. | mp >10° C. | Other (mass part) *4 | Cy ratio (%) | Lt ratio (%) |
|---|---|---|---|---|---|---|---|---|
| 101 | A1(0.1) | B1(0.1) | LiBF$_4$ | BL(60) | EC(40) | | 91 | 75 |
| 102 | A1(0.1) | B1(0.1) | LiBF$_4$ | BL(70) | EC(30) | | 92 | 82 |
| 103 | A1(1) | B1(1) | LiPF$_6$ | PC(60) | EC(40) | | 86 | 75 |
| 104 | A1(0.1) | B1(0.3) | LiBF$_4$ | BL(60) | EC(40) | | 91 | 75 |
| 105 | A1(0.3) | B1(0.1) | LiBF$_4$ | BL(60) | EC(40) | | 89 | 75 |
| 106 | A1(0.1) | B1(0.1) | LiBF$_4$ | BL(60) | EC(40) | VC(0.1) | 94 | 82 |

TABLE 1-continued

| Test No. *2 | Characteristic improving agent [1] (mass part) *1 | Characteristic improving agent [2] (mass part) *1 | Electrolyte salt | Organic Solvent (mass %) *3 mp ≤10° C. | Organic Solvent (mass %) *3 mp >10° C. | Other (mass part) *4 | Cy ratio (%) | Lt ratio (%) |
|---|---|---|---|---|---|---|---|---|
| 107 | A1(0.1) | B1(0.1) | LiBF$_4$ | BL(60) | EC(40) | VEC(0.1) | 94 | 82 |
| 108 | A1(0.1) | B2(0.1) | LiBF$_4$ | BL(60) | EC(40) | | 85 | 74 |
| 109 | A1(0.1) | B3(0.1) | LiBF$_4$ | BL(60) | EC(40) | | 85 | 75 |
| 110 | A1(0.1) | B4(0.1) | LiBF$_4$ | BL(60) | EC(40) | | 81 | 74 |
| 111 | A1(0.1) | B5(0.1) | LiBF$_4$ | BL(60) | EC(40) | | 88 | 75 |
| 112 | A2(0.1) | B1(0.1) | LiBF$_4$ | BL(60) | EC(40) | | 91 | 75 |
| 113 | A3(0.1) | B1(0.1) | LiBF$_4$ | BL(60) | EC(40) | | 91 | 75 |
| 114 | A4(0.1) | B1(0.1) | LiBF$_4$ | BL(60) | EC(40) | | 91 | 75 |
| 115 | A5(0.1) | B1(0.1) | LiBF$_4$ | BL(60) | EC(40) | | 91 | 75 |
| 116 | A6(0.1) | B1(0.1) | LiBF$_4$ | BL(60) | EC(40) | | 85 | 73 |
| 117 | A7(0.1) | B1(0.1) | LiBF$_4$ | BL(60) | EC(40) | | 86 | 74 |
| 118 | A8(0.1) | B1(0.1) | LiBF$_4$ | BL(60) | EC(40) | | 84 | 75 |
| 119 | A9(0.1) | B1(0.1) | LiBF$_4$ | BL(60) | EC(40) | | 85 | 75 |
| 120 | A1(0.1) | B1(0.1) | LiPF$_6$ | EMC(50) PC(50) | None | | 89 | 74 |
| 121 | A1(0.05) | B1(0.05) | LiBF$_4$ | BL(60) | EC(40) | | 91 | 75 |
| 122 | A1(0.5) | B1(0.5) | LiBF$_4$ | BL(60) | EC(40) | | 91 | 75 |
| 123 | A1(0.1) | B1(5) | LiBF$_4$ | BL(60) | EC(40) | | 83 | 68 |
| 124 | A1(0.1) | B1(10) | LiBF$_4$ | BL(60) | EC(40) | | 80 | 67 |
| 125 | A3(0.1) | B1(1) | LiBF$_4$ | BL(60) | EC(40) | | 85 | 70 |
| 126 | A2(0.15) | B5(0.05) | LiBF$_4$ | BL(70) | EC(30) | | 91 | 80 |
| 127 | A1(0.1) | B1(0.1) | LiPF$_6$ | BL(60) | EC(40) | | 91 | 75 |
| 128 | A1(0.1) | B1(0.1) | LiBF$_4$ | BL(50) DME(50) | None | | 90 | 73 |
| 129 | A1(0.1) | B6(0.1) | LiBF$_4$ | BL(60) | EC(40) | | 88 | 75 |
| 130 | A1(0.1) | B7(0.1) | LiBF$_4$ | BL(60) | EC(40) | | 89 | 74 |
| 131 | A1(0.1) | B8(0.1) | LiBF$_4$ | BL(60) | EC(40) | | 86 | 73 |
| 132 | A1(0.1) | B9(0.1) | LiBF$_4$ | BL(60) | EC(40) | | 88 | 74 |
| 133 | A1(0.1) | B10(0.1) | LiBF$_4$ | BL(60) | EC(40) | | 88 | 74 |
| c11 | None | None | LiBF$_4$ | BL(60) | EC(40) | | 46 | 61 |
| c12 | A1(0.1) | None | LiBF$_4$ | BL(60) | EC(40) | | 58 | 57 |
| c13 | None | B1(0.1) | LiBF$_4$ | BL(60) | EC(40) | | 52 | 57 |
| c14 | A1(0.1) | B1(0.1) | LiBF$_4$ | BL(50) | EC(50) | | 76 | 44 |
| c15 | Composition of Example 2-11 of JP-A-2004-63432 [A] | | | | | | 66 | 66 |
| c16 | Composition of Example 2d of JP-A-62-86673 [B] | | | | | | 58 | 58 |
| c17 | Composition of Example 2-4 of JP-A-2004-63432 [C] | | | | | | 70 | <5 |
| c18 | A1(0.1) | B1(15) | LiBF$_4$ | BL(60) | EC(40) | | 58 | 63 |

*1: part by mass with respect to 100 parts by mass of an organic solvent
*2: Nos. beginning with c are Comparative Examples and Nos. except those are Examples of the present invention
*3: % by mass when the whole amount of an organic solvent is regarded as 100% by mass
*4: part by mass with respect to 100 parts by mass of an organic solvent As is apparent from the results of Table 1, the secondary batteries using the liquid electrolyte of the present invention are high in both high-temperature cycle capacity maintaining ratio and low-temperature discharge capacity maintaining ratio. The secondary batteries of Comparative Examples may not cope with both high-temperature cycle capacity maintaining ratio and low-temperature capacity maintaining ratio.

[Evaluation 2 of Lithium Secondary Battery]
<Preparation of Battery (2)>

Lithium secondary batteries for evaluation which used the liquid electrolytes indicated in the following Table 2 were produced by using a lithium cobalt oxide mixture sheet (electrode capacity: 1.5 mAh/cm², aluminum foil base, 13 mmφ) for the positive electrode, a spheroidized natural graphite electrode sheet (electrode capacity: 1.6 mAh/cm²; Cu foil base, 14.5 mmφ) for the negative electrode, and a porous film made of PP (thickness: 25 μm, 16 mmφ) for the separator.

<Evaluation of Cycle Life Characteristic at High Temperature>

A 2032-type battery produced by the method described above was used, and in a thermostatic chamber at 45° C., the battery was subjected to constant current charging at 1 C until the battery voltage reached 4.2 V at 2 mA, subsequently to charging at a constant voltage of 4.2 V until the current value reached 0.12 mA or for 2 hours, and then to constant current discharging at 1 C until the battery voltage reached 2.75 V at 2 mA. This was defined as 1 cycle. This procedure was repeated up to 100th cycles. The cycle capacity maintaining ratio was calculated according to the following formula from discharge capacity (mAh) on 1st cycle and discharge capacity (mAh) on 100th cycle. A larger value brings smaller capacity deterioration and a favorable state even though charge and discharge are repeated at high temperature.

Cycle capacity maintaining ratio [Cy ratio](%)=(Discharge capacity on 100th cycle/Discharge capacity on 1st cycle)×100

<Evaluation of Discharge Capacity at Low Temperature>

The discharge capacity rate at −20° C. against 30° C. was measured using a 2032-type coin battery produced by the method described above. In a thermostatic chamber at 30° C., the battery was subjected to constant current charging at 0.1 C until the battery voltage reached 4.2 V at 0.2 mA, to charging at a constant voltage of 4.2 V until the current value reached 0.12 mA or for 2 hours, and then to constant current discharging at 1 C in a constant temperature chamber at −20° C. or 30° C. until the battery voltage reached 2.75 V at 2 mA. Thus, the discharge capacity was measured and "Low temperature discharge capacity maintaining rate" was calculated according to the following formula. A larger value brings smaller capacity deterioration and a favorable state even at low temperature.

Low temperature discharge capacity maintaining ratio [$Lt$ ratio](%)={(Discharge capacity at −20° C.)/(Discharge capacity at 30° C.)}×100

TABLE 2

| Test No. *2 | Characteristic improving agent [1] (mass part) *1 | Characteristic improving agent [2] (mass part) *1 | Electrolyte salt | Organic Solvent (mass %) *3 mp ≤10° C. | mp >10° C. | Other (mass part) *4 | Cy ratio (%) | Lt ratio (%) |
|---|---|---|---|---|---|---|---|---|
| 201 | A1(0.1) | B1(0.1) | LiPF$_6$ | EMC(70) | EC(30) | | 83 | 73 |
| 202 | A1(0.1) | B1(0.1) | LiPF$_6$ | PC(70) | EC(30) | | 75 | 72 |
| 203 | A1(0.1) | B1(0.1) | LiPF$_6$ | DEC(70) | EC(30) | | 82 | 73 |
| 204 | A1(0.1) | B1(0.1) | LiPF$_6$ | EMC(30) DMC(40) | EC(30) | | 82 | 72 |
| 205 | A1(0.1) | B1(0.1) | LiPF$_6$ | EMC(40) DMC(30) | EC(30) | | 82 | 67 |
| 206 | A1(0.1) | B1(0.1) | LiPF$_6$ | EMC(70) | EC(30) | VC(0.1) | 85 | 73 |
| c21 | None | None | LiPF$_6$ | EMC(70) | EC(30) | | 38 | 63 |
| c22 | A1(0.1) | None | LiPF$_6$ | EMC(70) | EC(30) | | 52 | 63 |
| c23 | None | B1(0.1) | LiPF$_6$ | EMC(70) | EC(30) | | 47 | 64 |
| c24 | A1(0.1) | B1(0.1) | LiPF$_6$ | EMC(50) | EC(50) | | 70 | 48 |
| c25 | Composition of Example 2-11 of JP-A-2004-63432 [A] | | | | | | 65 | 48 |
| c26 | Composition of Example 2d of JP-A-62-86673 [B] | | | | | | 37 | 64 |
| c27 | Composition of Example 2-4 of JP-A-2004-63432 [C] | | | | | | 52 | <5 |

*1 to *4 have the same meanings as those of Table 1.

As is apparent from the results of Table 2, it is found that the liquid electrolyte of the present invention performs the effect even in the secondary battery of a different type.

Having described our invention as related to the present embodiments, it is our intention that the invention not be limited by any of the details of the description, unless otherwise specified, but rather be construed broadly within its spirit and scope as set out in the accompanying claims.

This application claims a priority on Patent Application No. 2012-051404 filed in Japan on Mar. 8, 2012, which is entirely herein incorporated by reference.

REFERENCE SIGNS LIST

1 Positive electrode conductive material
2 Positive electrode active material
3 Negative electrode conductive material
4 Negative electrode active material
5 Liquid electrolyte
6 Operating means
7 Circuit wiring
9 Separator
10 Lithium ion secondary battery
12 Separator
14 Positive electrode sheet
16 Negative electrode sheet
18 Packaging can double as a negative electrode
20 Insulating plate
22 Opening sealing plate
24 Positive electrode current collector
26 Gasket
28 Pressure-sensitive valve body
30 Current blocking element
100 Bottomed cylindrical lithium secondary battery

The invention claimed is:

1. A non-aqueous liquid electrolyte for a secondary battery, comprising:

at least one selected from a sulfur-containing ring compound and/or a carbonate compound having a halogen atom;

an aromatic ketone compound;

an organic solvent; and an electrolyte salt, wherein, with respect to 100 parts by mass of the organic solvent, the aromatic ketone compound is 0.001 to 10 parts by mass and the at least one selected from a carbonate compound having a halogen atom and a sulfur-containing ring compound is 0.001 to 10 parts by mass, and more than 50% by mass of the whole amount of the organic solvent comprises a solvent with a melting point of 10° C. or less, wherein the carbonate compound containing a halogen atom is a compound represented by the following formula (F2):

(F2)

wherein R$^G$ and R$^H$ represent an alkyl group, any one of R$^G$ and R$^H$ has a halogen atom, and an oxy group may exist in the alkyl group, wherein the sulfur-containing ring compound is represented by the following formula (S1-1), (S2-1) or (S3-1):

(S1-1)

-continued

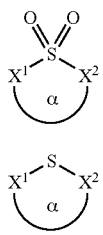
(S2-1)

(S3-1)

wherein X¹ and X² represent —O— or —C(Ra)(Rb)—, and wherein the skeleton of the 5- or 6-membered ring formed by a includes a sulfur atom and a carbon atom and optionally an oxygen atom, wherein the aromatic ketone compound is a compound represented by the following formula (1):

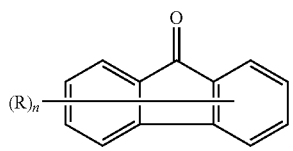
(1)

wherein $R^1$ and $R^2$ represent an aromatic group; and $R^1$ and $R^2$ may bind to each other directly or via a linking group to form a 5- to 8-membered ring containing C=O of formula (1), and may form a multimer.

2. The non-aqueous liquid electrolyte for a secondary battery according to claim 1, wherein the solvent with a melting point of 10° C. or less contains a compound having a chain carbonate structure or an ester structure.

3. The non-aqueous liquid electrolyte for a secondary battery according to claim 1, wherein the organic solvent is composed of a compound except the carbonate compound having a halogen atom, the sulfur-containing ring compound, and the aromatic ketone compound.

4. The non-aqueous liquid electrolyte for a secondary battery according to claim 1, wherein the organic solvent is composed of an atom selected from a carbon atom, a hydrogen atom, an oxygen atom, a nitrogen atom, a phosphorus atom, and a boron atom.

5. The non-aqueous liquid electrolyte for a secondary battery according to claim 1, wherein the aromatic ketone compound represented by formula (1) is a compound represented by the following formula (2):

(2)

wherein R represents a substituent; and n represents an integer of 0 to 8.

6. The non-aqueous liquid electrolyte for a secondary battery according to claim 1, wherein the aromatic ketone compound represented by formula (1) is a compound represented by any one of the following formulae (1-1) to (1-24):

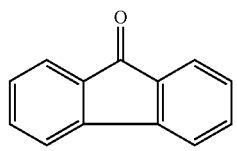
(1-1)

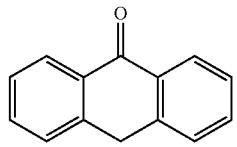
(1-2)

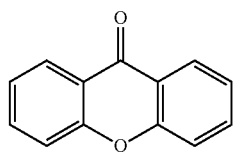 [SMILES: O=c1c2ccccc2oc2ncccc12]
(1-3)

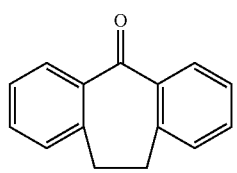
(1-4)

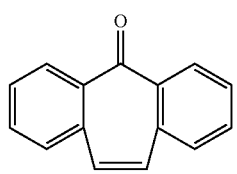
(1-5)

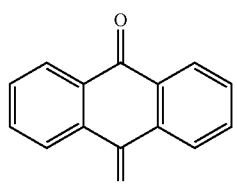
(1-6)

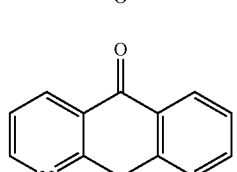
(1-7)

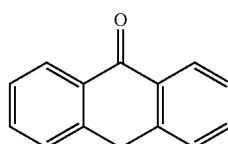
(1-8)

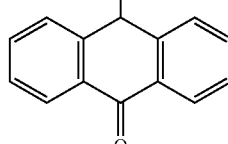
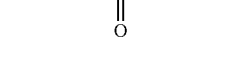

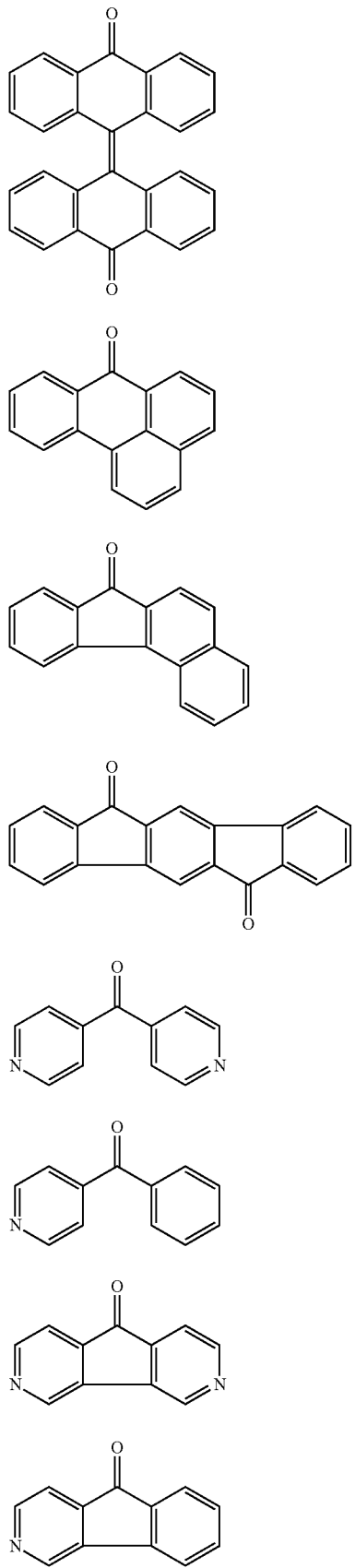
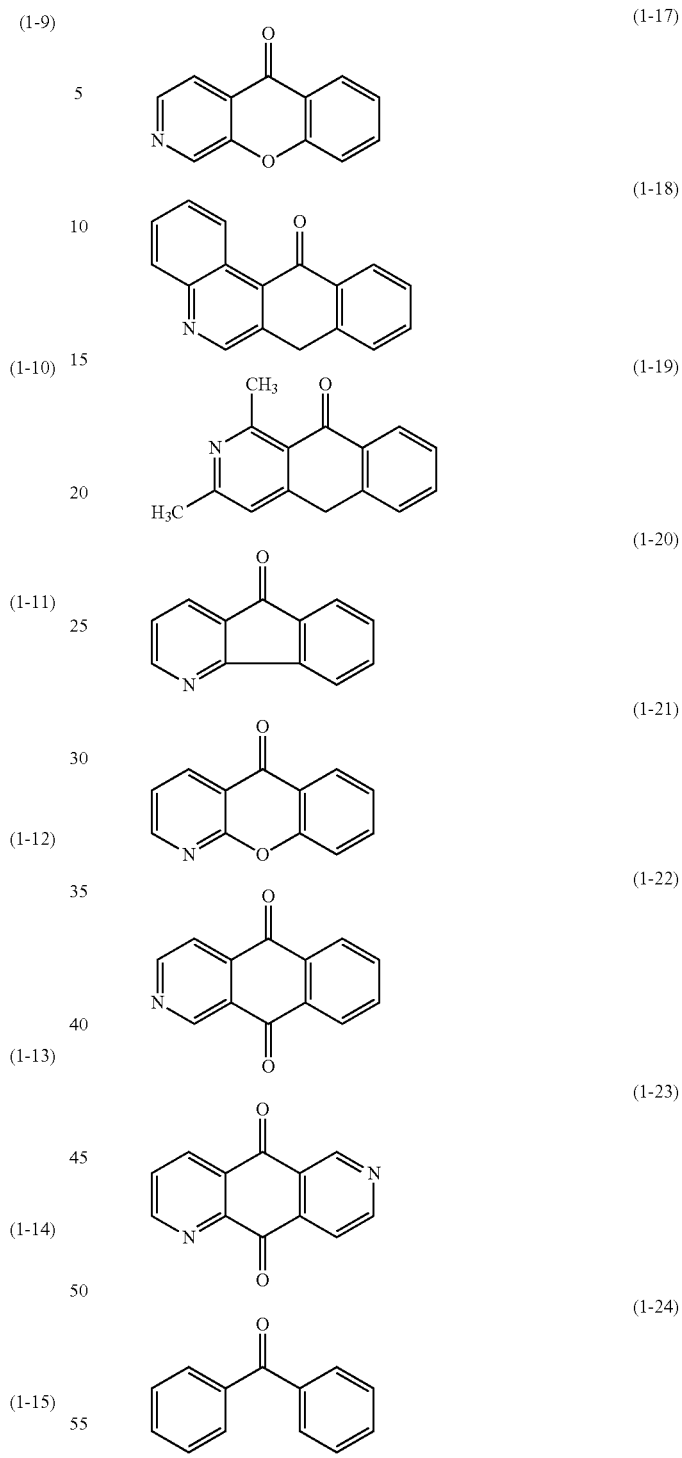

wherein the compound represented by each of the formulae may be substituted or unsubstituted.

7. A lithium secondary battery using the non-aqueous liquid electrolyte for a secondary battery according to claim 1.

8. The non-aqueous liquid electrolyte for a secondary battery according to claim 1, wherein the carbonate compound having a halogen atom is represented by any one of the following formulae FC-7 to FC-12:

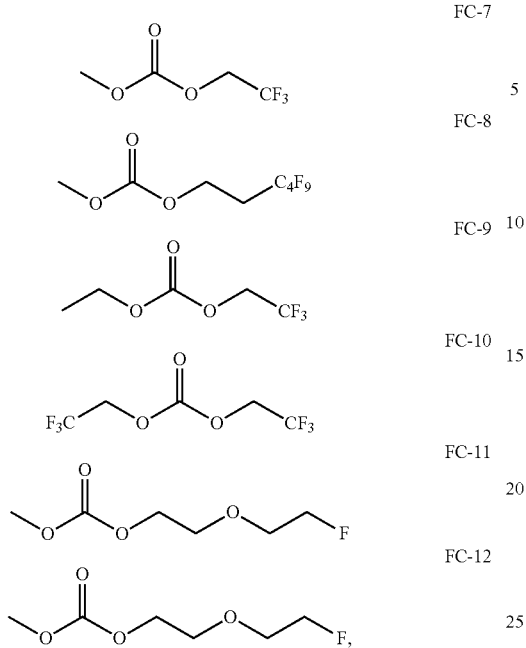
FC-7
FC-8
FC-9
FC-10
FC-11
FC-12
and the sulfur-containing ring compound is the compound represented by formula (S1-1) or (S3-1).
* * * * *